(12) United States Patent
Ashjaee

(10) Patent No.: US 12,523,469 B2
(45) Date of Patent: Jan. 13, 2026

(54) METHOD OF CALIBRATING A TOTAL STATION USING A GNSS DEVICE

(71) Applicant: Javad GNSS, Inc., San Jose, CA (US)

(72) Inventor: Javad Ashjaee, Saratoga, CA (US)

(73) Assignee: Javad GNSS, Inc., San Jose, CA (US)

( * ) Notice: Subject to any disclaimer, the term of this patent is extended or adjusted under 35 U.S.C. 154(b) by 460 days.

(21) Appl. No.: 18/297,474

(22) Filed: Apr. 7, 2023

(65) Prior Publication Data

US 2023/0251088 A1    Aug. 10, 2023

Related U.S. Application Data

(63) Continuation of application No. 16/413,017, filed on May 15, 2019, now Pat. No. 11,656,076.
(Continued)

(51) Int. Cl.
*G01C 11/02* (2006.01)
*G01C 11/00* (2006.01)
(Continued)

(52) U.S. Cl.
CPC .............. *G01C 11/02* (2013.01); *G01C 11/00* (2013.01); *G01C 15/02* (2013.01); *G01S 19/07* (2013.01);
(Continued)

(58) Field of Classification Search
None
See application file for complete search history.

(56) References Cited

U.S. PATENT DOCUMENTS

| 5,471,218 A | 11/1995 | Talbot et al. |
| 6,369,755 B1 | 4/2002 | Nichols et al. |

(Continued)

FOREIGN PATENT DOCUMENTS

| CN | 107084710 B | 6/2020 |
| EP | 2875317 B1 | 8/2017 |

(Continued)

OTHER PUBLICATIONS

U.S. Appl. No. 16/413,017, "Corrected Notice of Allowability", Apr. 12, 2023, 3 pages.
(Continued)

*Primary Examiner* — Robert W Hodge
*Assistant Examiner* — Brandon James Henson
(74) *Attorney, Agent, or Firm* — Kilpatrick Townsend & Stockton LLP

(57) ABSTRACT

A method of calibrating a total station using a GNSS device includes physically coupling the total station with the GNSS device at a first location; determining the position of the total station at the first location based on position data received by the GNSS device; decoupling the total station from the GNSS device; moving the GNSS device to a second location while leaving the total station at the first location; determining the position of the GNSS device at the second location based on position data received by the GNSS device; adjusting the position of a camera on the total station to image the GNSS device while at the second location; determining axes of the camera based on the orientation of the camera and the determined positions at the first and second locations; and calibrating encoders of the total station based on the determined axes.

20 Claims, 31 Drawing Sheets

Related U.S. Application Data

(60) Provisional application No. 62/798,657, filed on Jan. 30, 2019, provisional application No. 62/686,592, filed on Jun. 18, 2018, provisional application No. 62/671,934, filed on May 15, 2018.

(51) Int. Cl.
*G01C 15/02* (2006.01)
*G01S 19/07* (2010.01)
*G01S 19/12* (2010.01)
*G01S 19/23* (2010.01)
*G01S 19/26* (2010.01)
*G01S 19/51* (2010.01)

(52) U.S. Cl.
CPC ............ *G01S 19/12* (2013.01); *G01S 19/235* (2013.01); *G01S 19/26* (2013.01); *G01S 19/51* (2013.01)

(56) References Cited

U.S. PATENT DOCUMENTS

| | | |
|---|---|---|
| 8,022,868 B2 | 9/2011 | Yudanov et al. |
| 8,094,087 B2 | 1/2012 | Ashjaee et al. |
| 8,120,527 B2 | 2/2012 | Ashjaee et al. |
| 8,125,376 B1 | 2/2012 | Ashjaee et al. |
| 8,169,379 B2 | 5/2012 | Zhukov et al. |
| 8,224,525 B1 | 7/2012 | Rapoport et al. |
| 8,606,498 B2 | 12/2013 | Pesterev et al. |
| 8,629,988 B2 | 1/2014 | Gribkov |
| 8,717,232 B2 | 5/2014 | Ashjaee et al. |
| 8,717,233 B2 | 5/2014 | Ashjaee et al. |
| 8,872,700 B2 | 10/2014 | Ashjaee et al. |
| 8,975,967 B2 | 3/2015 | Ashjaee et al. |
| 9,035,826 B2 | 5/2015 | Ashjaee et al. |
| 9,103,912 B2 | 8/2015 | Yudanov et al. |
| 9,168,946 B2 | 10/2015 | Ashjaee et al. |
| 9,228,835 B2 | 1/2016 | Gribkov et al. |
| 9,250,328 B2 | 2/2016 | Ashjaee et al. |
| 9,671,497 B2 | 6/2017 | Ashjaee et al. |
| 9,720,093 B2 | 8/2017 | Ashjaee |
| 9,748,926 B2 | 8/2017 | Ashjaee et al. |
| 9,857,476 B2 | 1/2018 | Mathews et al. |
| 10,281,588 B2 | 5/2019 | Ashjaee |
| 10,338,228 B2 | 7/2019 | Ashjaee |
| 10,386,497 B2 | 8/2019 | Ashjaee |
| 10,408,944 B2 | 9/2019 | Ashjaee |
| 10,514,467 B2 | 12/2019 | Ashjaee |
| 11,656,076 B2 | 5/2023 | Ashjaee |
| 11,808,866 B2 | 11/2023 | Ashjaee |
| 2002/0019698 A1 | 2/2002 | Vilppula et al. |
| 2007/0188380 A1 | 8/2007 | Duong et al. |
| 2011/0287779 A1 | 11/2011 | Harper et al. |
| 2012/0166137 A1 | 6/2012 | Grasser et al. |
| 2012/0229333 A1 | 9/2012 | Ashjaee et al. |
| 2012/0299936 A1 | 11/2012 | Ashjaee et al. |
| 2013/0016006 A1 | 1/2013 | Ashjaee et al. |
| 2014/0062778 A1 | 3/2014 | Ashjaee et al. |
| 2014/0210663 A1 | 7/2014 | Metzler |
| 2015/0042977 A1 | 2/2015 | Siercks et al. |
| 2015/0062309 A1 | 3/2015 | Mein et al. |
| 2015/0116145 A1 | 4/2015 | Ashjaee |
| 2015/0140982 A1 | 5/2015 | Postrel |
| 2015/0234055 A1 | 8/2015 | Ashjaee et al. |
| 2016/0041268 A1 | 2/2016 | Ashjaee |
| 2016/0138919 A1* | 5/2016 | Green ................. H04N 23/633 |
| | | 348/135 |
| 2016/0178368 A1 | 6/2016 | Ashjaee |
| 2016/0178754 A1 | 6/2016 | Ashjaee |
| 2017/0067739 A1 | 3/2017 | Siercks et al. |
| 2017/0293032 A1 | 10/2017 | Ashjaee |
| 2017/0343678 A1 | 11/2017 | Ashjaee |
| 2018/0045834 A1 | 2/2018 | Ashjaee |
| 2018/0062677 A1 | 3/2018 | Ashjaee |
| 2018/0283862 A1* | 10/2018 | Kahle .................... G01S 5/163 |
| 2019/0011570 A1 | 1/2019 | Ashjaee |
| 2019/0154839 A1 | 5/2019 | Ashjaee |
| 2019/0353798 A1 | 11/2019 | Ashjaee |
| 2020/0096598 A1 | 3/2020 | Jadav et al. |
| 2020/0209394 A1 | 7/2020 | Mark et al. |
| 2020/0217662 A1 | 7/2020 | Gächter Toya et al. |
| 2021/0090448 A1 | 3/2021 | Raptopoulos et al. |

FOREIGN PATENT DOCUMENTS

| | | |
|---|---|---|
| EP | 2810019 B2 | 12/2019 |
| JP | 2004037140 A | 2/2004 |
| JP | 2004347576 A | 12/2004 |
| KR | 20100104976 A | 9/2010 |

OTHER PUBLICATIONS

U.S. Appl. No. 16/413,017, "Corrected Notice of Allowability", Mar. 1, 2023, 2 pages.
U.S. Appl. No. 16/413,017, "Corrected Notice of Allowability", Jan. 23, 2023, 4 pages.
U.S. Appl. No. 16/413,017, Final Office Action, Mailed on May 23, 2022, 41 pages.
U.S. Appl. No. 16/413,017, Non-Final Office Action, Mailed on Aug. 31, 2021, 32 pages.
U.S. Appl. No. 16/413,017, Notice of Allowance, Mailed on Nov. 16, 2022, 13 pages.
U.S. Appl. No. 16/987,107, Final Office Action, Mailed on Mar. 24, 2023, 26 pages.
Application No. 16/987, 107, Non-Final Office Action, Mailed on Oct. 12, 2022, 15 pages.
Button , "Dictionary of Multimedia and Internet Applications: A Guide for Developers and Users", Credo Reference, Available Online at: https://search.credoreference.com/content/entry/wdmia/button/0, 1999, 2 pages.
U.S. Appl. No. 16/987,107, "Notice of Allowance", Jul. 10, 2023, 10 pages.
U.S. Appl. No. 18/476,842, "Notice of Allowance", May 15, 2024, 8 pages.
U.S. Appl. No. 18/476,842, "Non-Final Office Action", Apr. 23, 2024, 7 pages.
U.S. Appl. No. 18/752,502, Non-Final Office Action, Mailed on Mar. 12, 2025, 10 pages.

* cited by examiner

FIG. 17B

METHOD OF CALIBRATING A TOTAL STATION USING A GNSS DEVICE

CROSS REFERENCE TO RELATED APPLICATIONS

This application is a continuation of U.S. Non Provisional application Ser. No. 16/413,017, filed May 15, 2019, which claims priority to U.S. Provisional Application Ser. No. 62/671,934 filed May 15, 2018, U.S. Provisional Application Ser. No. 62/686,592, filed Jun. 18, 2018, and U.S. Provisional Application Ser. No. 62/798,657, filed Jan. 30, 2019, which are incorporated herein by reference in their entirety.

FIELD OF THE INVENTION

The present invention relates to a portable Global Navigation Satellite System (GNSS), including Global Positioning System (GPS), GLONASS, Galileo, and other satellite navigation and positioning systems.

BACKGROUND OF THE INVENTION

Today, the number of applications utilizing GNSS information is rapidly increasing. For example, GNSS information is a valuable tool for geodesists. Geodesists commonly use GNSS devices to determine the location of a point of interest anywhere on, or in the vicinity of, the Earth. Often, these points of interest are located at remote destinations which are difficult to access. Thus, compact, easy-to-carry positioning devices are desired.

GNSS receivers work by receiving data from GNSS satellites. To achieve millimeter and centimeter level accuracy, at least two GNSS receivers are needed. One receiver is positioned at a site where the position is known. A second receiver is positioned at a site whose position needs to be determined. The measurement from the first receiver is used to correct GNSS system errors at the second receiver. In post-processed mode, the data from both receivers can be stored and then transferred to a computer for processing. Alternatively, the corrections from the first receiver, the known receiver, may be transmitted in real time (via radio modems, Global System for Mobile Communications (GSM), etc.) to the unknown receiver, and the accurate position of the unknown receiver determined in real time.

A GNSS receiver typically includes a GNSS antenna, a signal processing section, a display and control section, a data communications section (for real-time processing), a battery, and a charger. Some degree of integration of these sections is usually desired for a handheld portable unit.

Another challenge of portable GNSS units is precisely positioning a GNSS antenna on the point of interest for location measurement. Previously, bulky equipment such as a separate tripod or other external hardware was used to "level" the antenna. In other systems, light low-precision antennas were used. Such devices are bulky and difficult to carry. Thus, even as portable GNSS positioning devices become more compact, they suffer from the drawback of requiring additional bulky positioning equipment.

Thus, for high-precision applications, the use of multiple units to house the various components required for prior GNSS systems, and the requirement for cables and connectors to couple the units, creates problems regarding portability, reliability, and durability. In addition, the systems are expensive to manufacture and assemble.

BRIEF SUMMARY OF THE DISCLOSURE

Embodiments of the present disclosure are directed to a handheld GNSS device for determining position data for a point of interest. The device includes a housing, handgrips integral to the housing for enabling a user to hold the device, and a display screen integral with the housing for displaying image data and orientation data to assist a user in positioning the device. The device further includes a GNSS antenna and at least one communication antenna, both integral with the housing. The GNSS antenna receives position data from a plurality of satellites. One or more communication antennas receive positioning assistance data related to the position data from a base station. The GNSS antenna has a first antenna pattern, and the at least one communication antenna has a second antenna pattern. The GNSS antenna and the communication antenna(s) are configured such that the first and second antenna patterns are substantially separated.

Coupled to the GNSS antenna, within the housing, is at least one receiver. Further, the device includes, within the housing, orientation circuitry for generating orientation data of the housing based upon a position of the housing related to the horizon, imaging circuitry for obtaining image data concerning the point of interest for display on the display screen, and positioning circuitry, coupled to the at least one receiver, the imaging circuitry, and the orientation circuitry, for determining a position for the point of interest based on at least the position data, the positioning assistance data, the orientation data, and the image data.

BRIEF DESCRIPTION OF THE DRAWINGS

FIG. 17B illustrate various information being displayed during a collection phase using a GNSS device and total station.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention as claimed. Thus, the various embodiments are not intended to be limited to the examples described herein and shown, but are to be accorded the scope consistent with the claims.

Embodiments of the invention relate to mounting a GNSS antenna and communication antennas in a single housing. The communication antennas are for receiving differential correction data from a fixed or mobile base transceiver, as described in U.S. patent application Ser. No. 12/360,808, assigned to the assignee of the present invention, and incorporated herein by reference in its entirety for all purposes. Differential correction data may include, for example, the difference between measured satellite pseudo-ranges and actual pseudo-ranges. This correction data received from a base station may help to eliminate errors in the GNSS data received from the satellites. Alternatively, or in addition, the communication antenna may receive raw range data from a moving base transceiver. Raw positioning data received by the communication antenna may be, for example, coordinates of the base and other raw data, such as the carrier phase of a satellite signal received at the base transceiver and the pseudo-range of the satellite to the base transceiver.

Additionally, a second navigation antenna may be connected to the handheld GNSS device to function as the primary navigation antenna if the conditions and/or orientation do not allow the first GNSS antenna to receive a strong GNSS signal.

Figure 1:
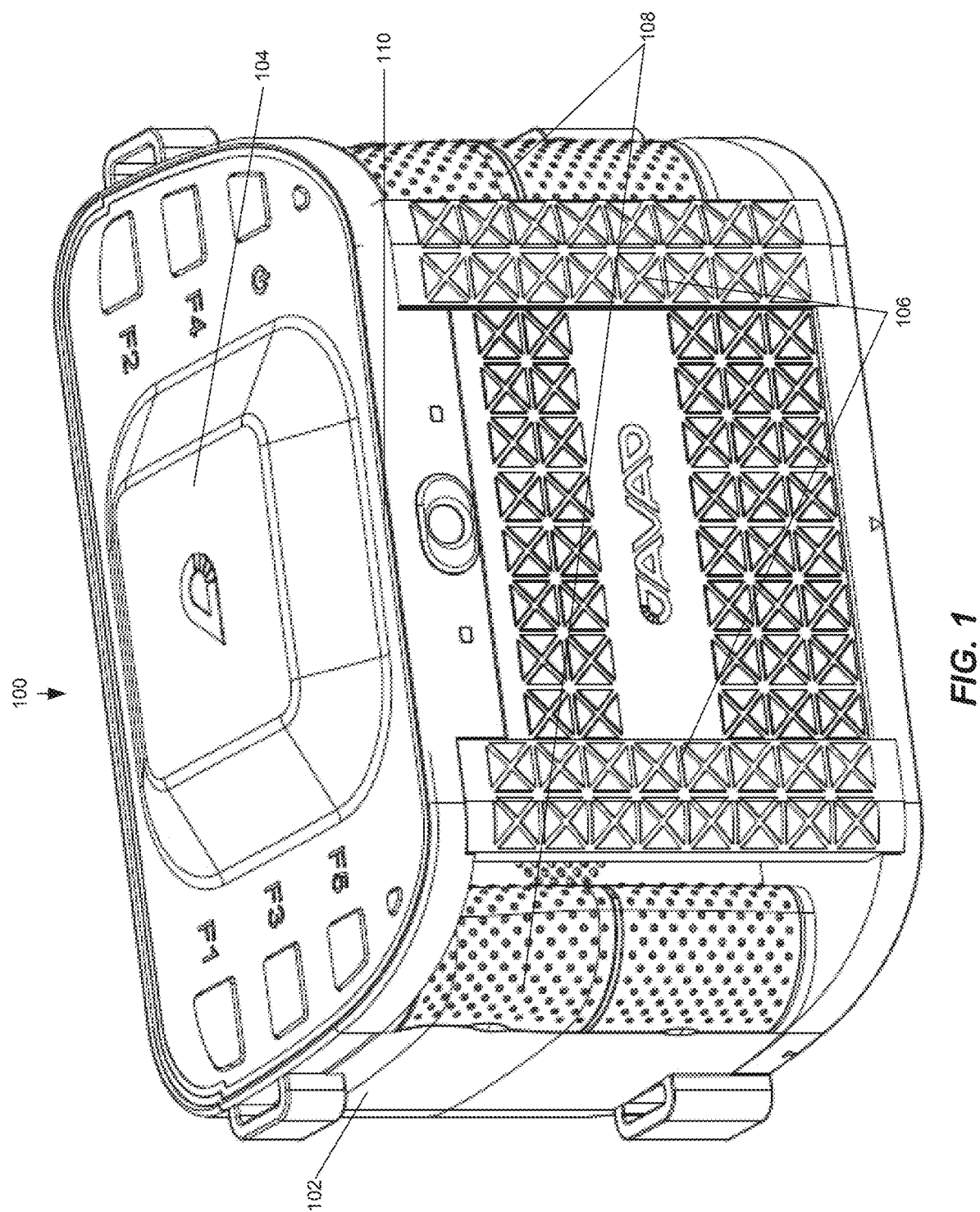
FIG. 1 illustrates a perspective view of a handheld GNSS device according to embodiments of the invention.

The communication antenna is configured such that its antenna pattern is substantially separated from the antenna pattern of the GNSS antenna such that there is minimal or nearly minimal mutual interference between the antennas. As used herein, "substantial" separation may be achieved by positioning the communication antenna below the main ground plane of the GNSS antenna, as shown in FIG. 1. According to embodiments of the invention, a substantial separation attenuates interference between the communication antenna and the GNSS antenna by as much as 40 dB. Furthermore, the communication antenna and the GNSS antenna are positioned such that the body of the user holding the GNSS device does not substantially interfere with the GNSS signal.

Moreover, as mentioned above, to properly measure the position of a given point using a GNSS-based device, the GNSS antenna must be precisely positioned so that the position of the point of interest may be accurately determined. To position a GNSS device in such a manner, external hardware, such as a tripod, is commonly used. Such hardware is bulky and difficult to carry. Thus, according to embodiments of the invention, compact positioning tools, included in the single unit housing, are useful for a portable handheld GNSS device.

As such, various embodiments are described below relating to a handheld GNSS device. The handheld GNSS device may include various sensors, such as a camera, distance sensor, and horizon sensors. A display element may also be included for assisting a user to position the device without the aid of external positioning equipment (e.g., a tripod or pole).

FIG. 1 illustrates an exemplary handheld GNSS device 100. Handheld GNSS device 100 utilizes a single housing 102. Several GNSS elements are integral to the housing 102 in that they are within the housing or securely mounted thereto. A securely mounted element may be removable. Housing 102 allows the user to hold the handheld GNSS device 100 similar to the way one would hold a typical camera. In one example, the housing 102 may include GNSS antenna cover 104 to cover a GNSS antenna 802 (shown in FIG. 8) which may receive signals transmitted by a plurality of GNSS satellites and used by handheld GNSS device 100 to determine position. The GNSS antenna 802 is integral with the housing 102 in that it resides in the housing 102 under the GNSS antenna cover 104.

Figure 5:
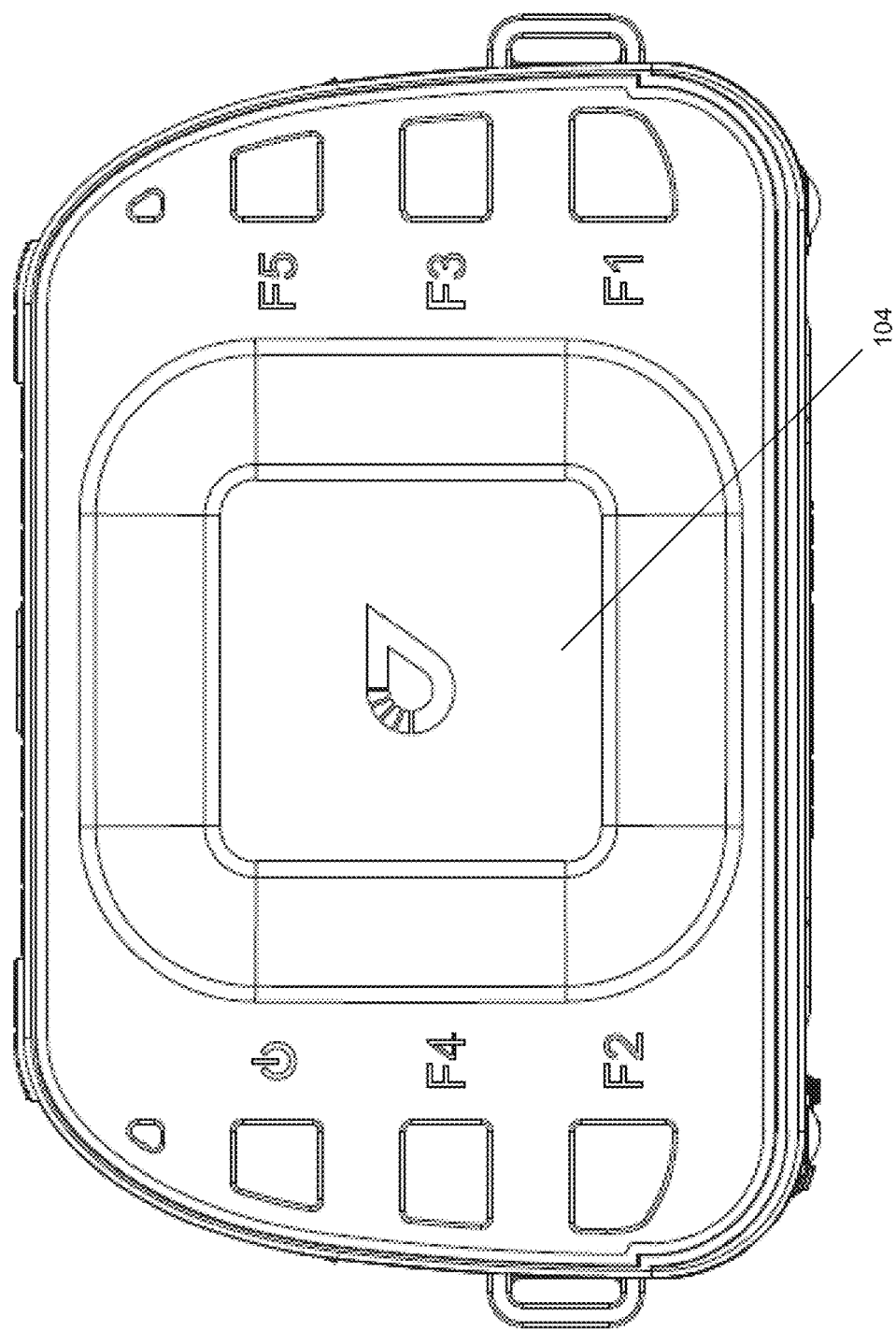
FIG. 5 illustrates a top view of a handheld GNSS device according to embodiments of the invention.

In one example, GNSS antenna 802 may receive signals transmitted by at least four GNSS satellites. In the example shown by FIG. 1, GNSS antenna cover 104 is located on the top side of handheld GNSS device 100. An exemplary top side view of the handheld GNSS device 100 is illustrated in FIG. 5.

Handheld GNSS device 100 further includes covers for communication antennas 106 integral with the housing 102. In embodiments of the invention there may be three such communication antennas, including GSM, UHF, and WiFi/Bluetooth antennas enclosed beneath covers for the communication antennas 106.

Figure 8:
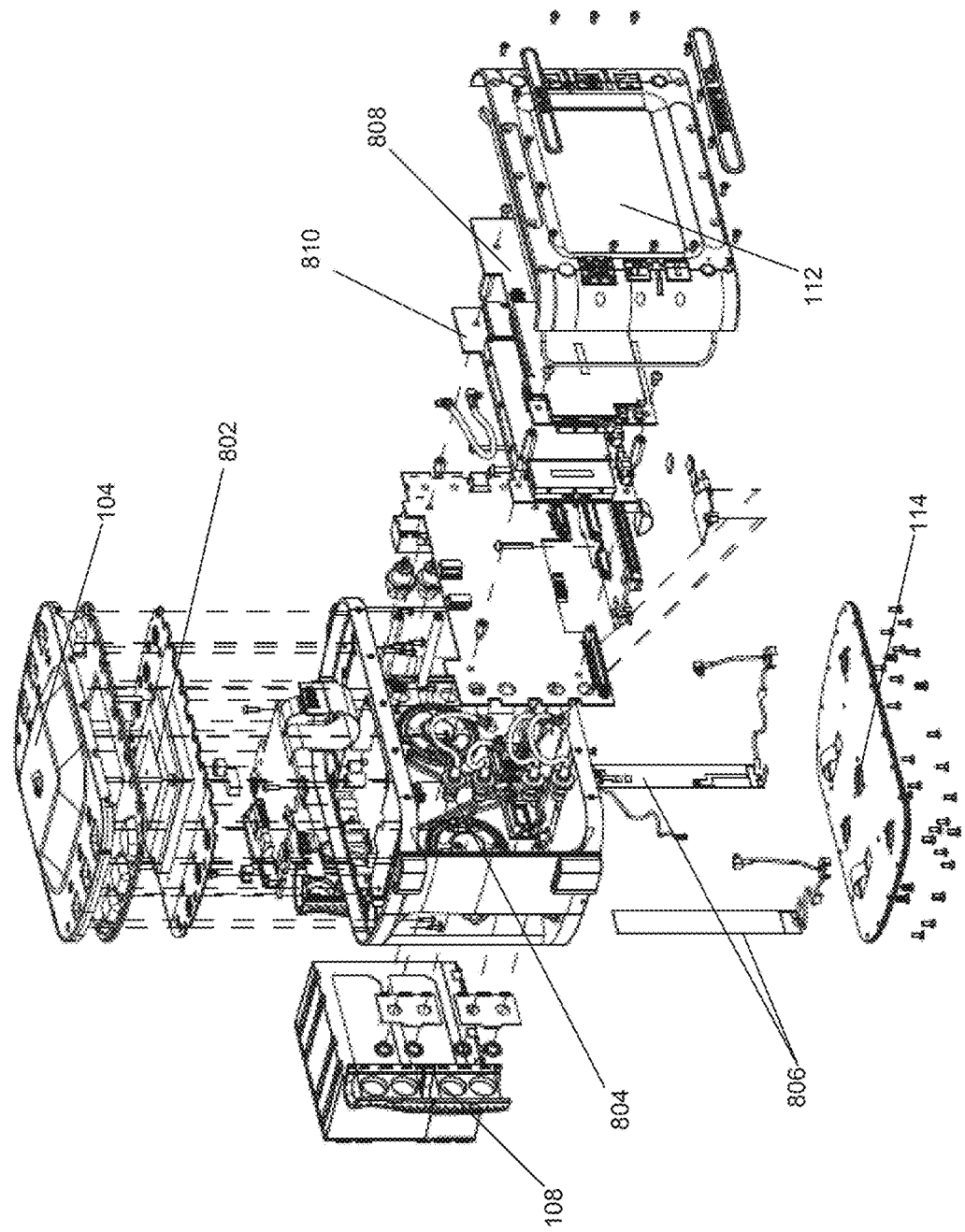
FIG. 8 illustrates an exploded view of a handheld GNSS device including a viewfinder for a camera according to embodiments of the invention.

An exemplary exploded view of handheld GNSS device 100 is shown in FIG. 8. Communication antennas 806 are positioned beneath the covers 106. The GSM and UHF antennas may be only one-way communication antennas. In other words, the GSM and UHF antenna may only be used to receive signals, but not transmit signals. The WiFi antenna may allow two-way communication. The communication antennas 806 receive positioning assistance data, such as differential correction data or raw positioning data from base transceivers.

In the example shown in FIG. 1, the GNSS antenna cover 104 is located on the top of the housing 102. In the same example of FIG. 1, the communication antenna covers 106 are located on the front of the housing 102.

Handheld GNSS device 100 may further include at least one handgrip 108. In the example shown in FIG. 1, two handgrips 108 are integral to the housing 102. The handgrips 108 may be covered with a rubber material for comfort and to reduce slippage of a user's hands.

Figure 7:
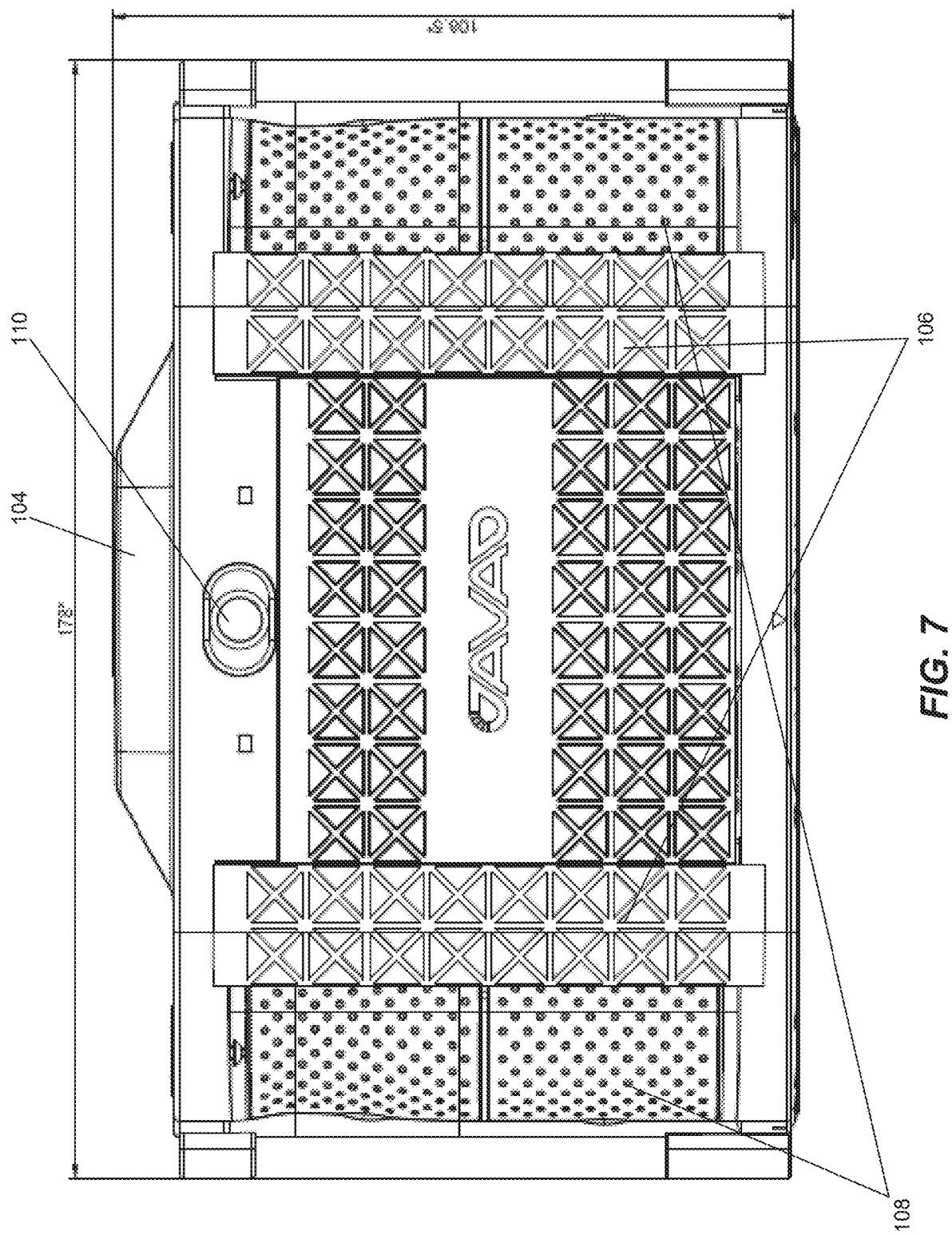
FIG. 7 illustrates a front view of a handheld GNSS device including a viewfinder for a camera according to embodiments of the invention.

The GNSS antenna cover 104, the communication antenna covers 106 and the handgrips 108 are shown from another view in the exemplary front view illustrated in FIG. 7. A front camera lens 110 is located on the front side of the handheld GNSS device 100. A second bottom camera lens 116 may be located on the bottom side of the handheld GNSS device 100 in the example shown in FIG. 4. The camera included may be a still or video camera.

Figure 6:
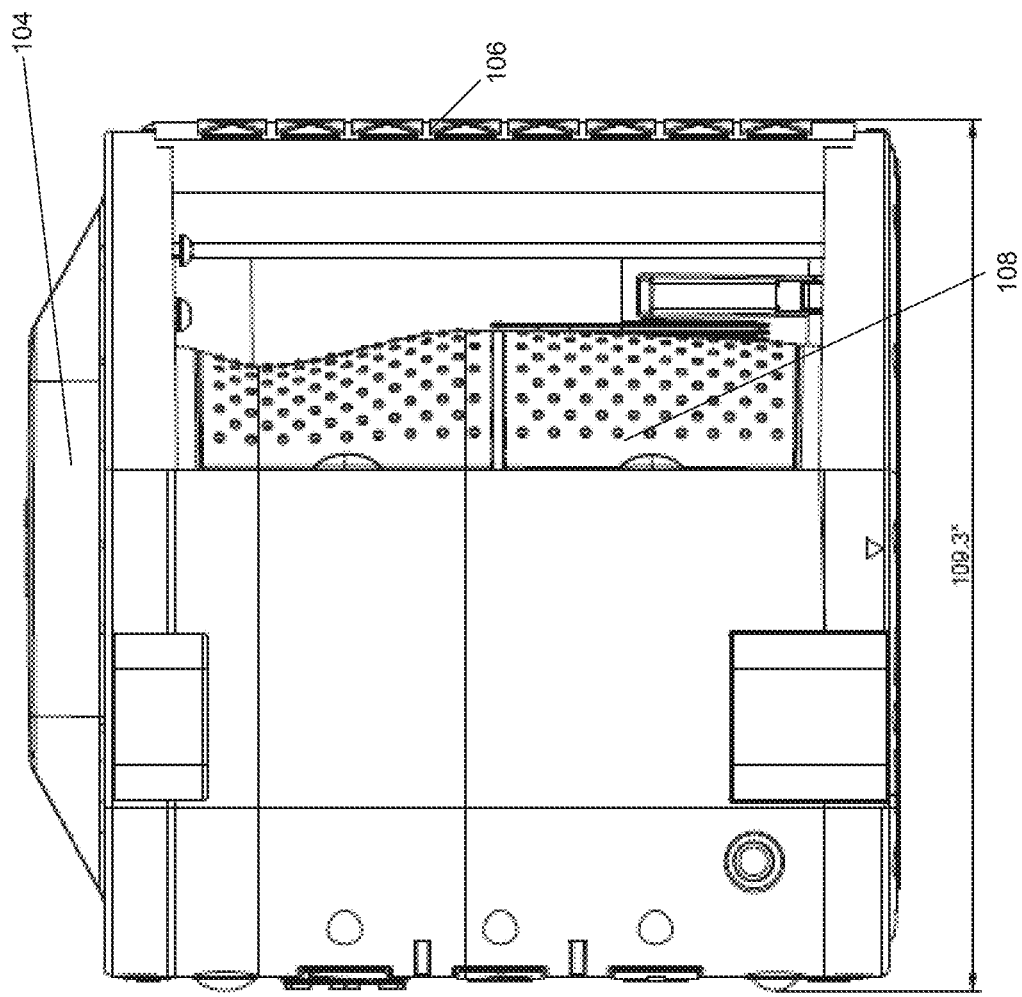
FIG. 6 illustrates a side view of a handheld GNSS device including handgrips for a user according to embodiments of the invention.

The handgrips 108, in certain embodiments, may also be positioned to be near to the communication antenna covers 106. Handgrips 108 are shown in a position, as in FIG. 6, that, when a user is gripping the handgrips 108, the user minimally interferes with the antenna patterns of GNSS antenna 802 and communication antennas 806. For example, the user's hands do not cause more than −40 dB of interference while gripping the handgrips 108 in this configuration, e.g., with the handgrips 108 behind and off to the side of the communication antenna covers 106.

Figure 2:
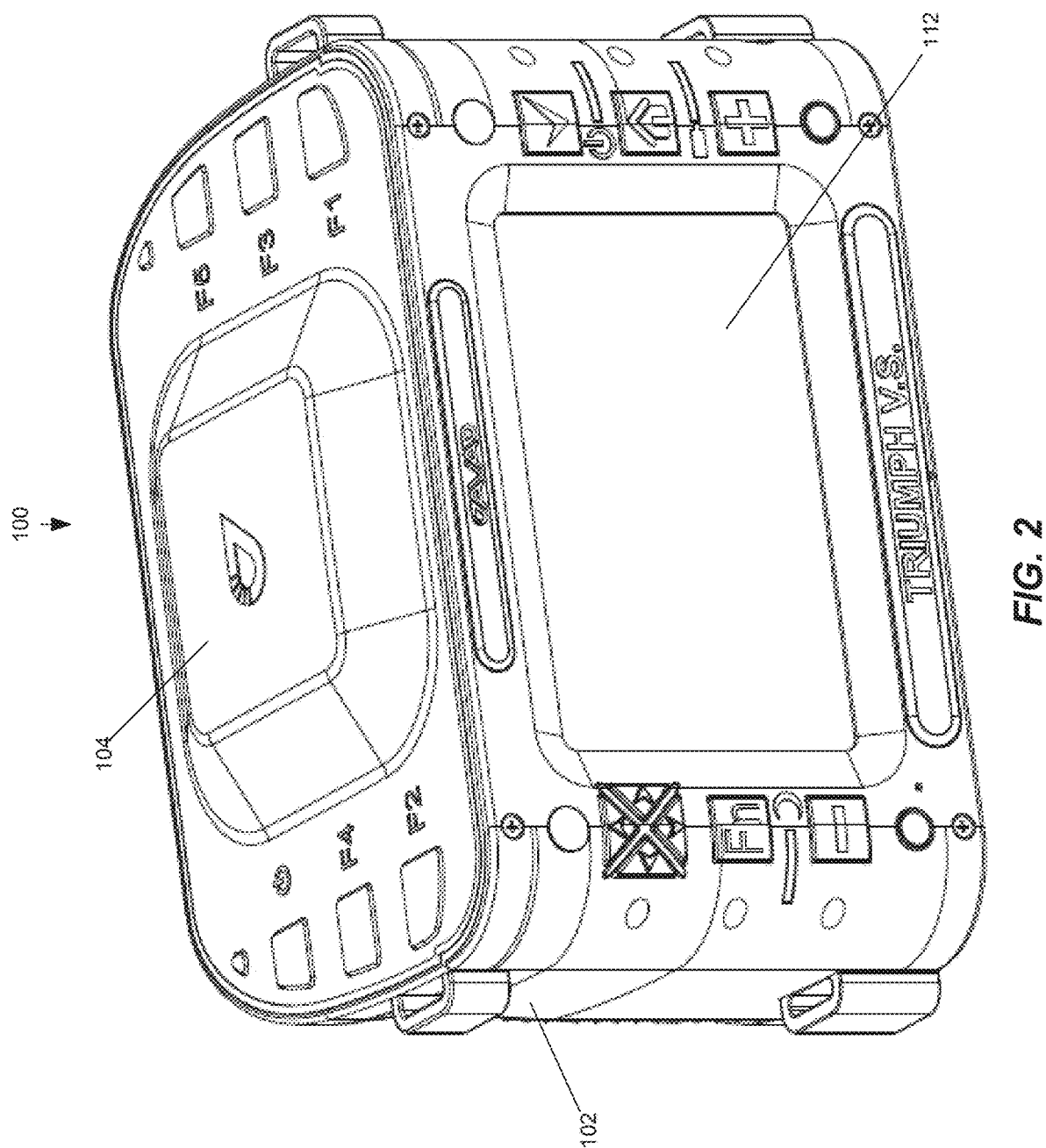
FIG. 2 illustrates another perspective view of a handheld GNSS device according to embodiments of the invention.
Figure 3:
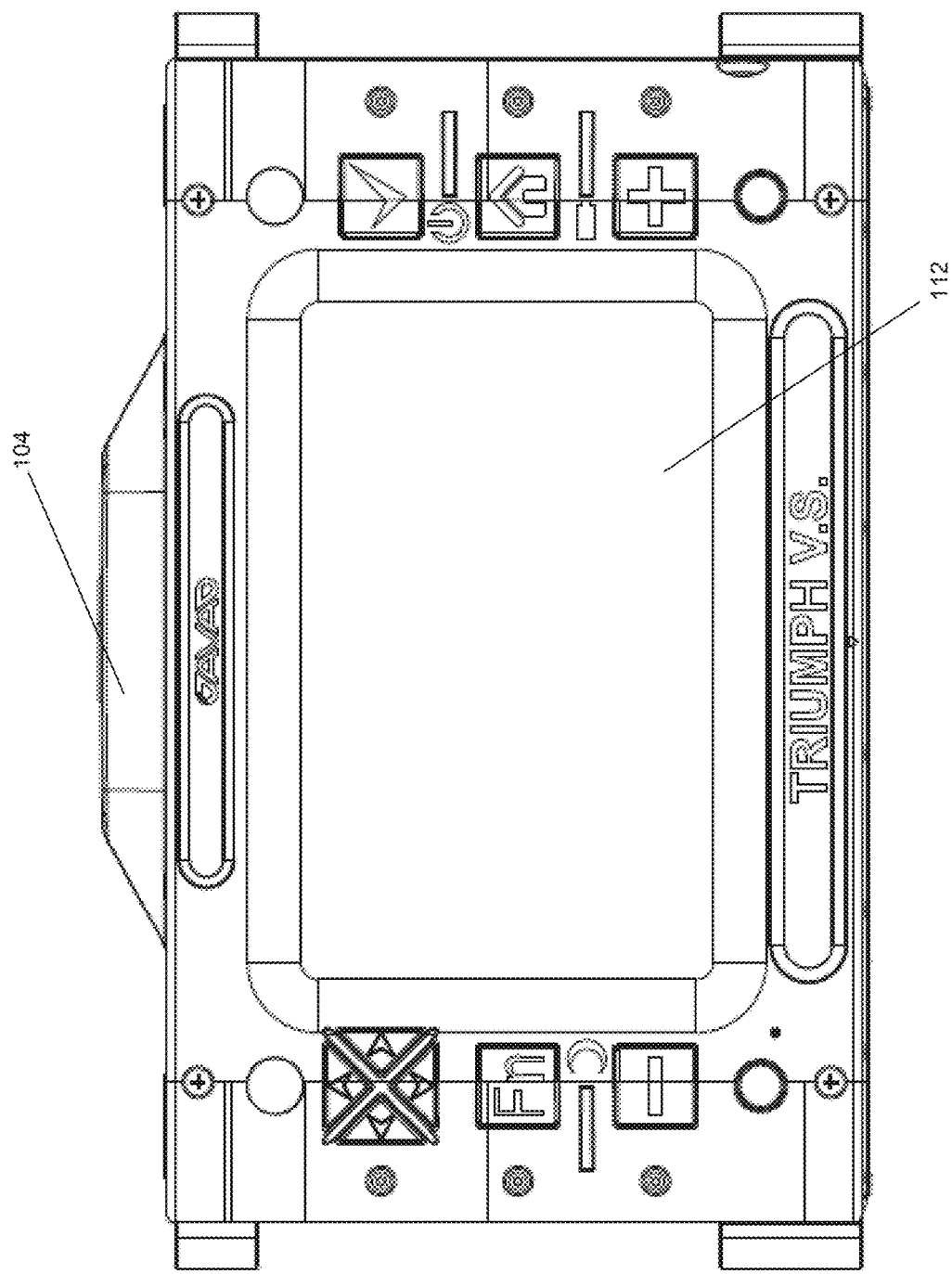
FIG. 3 illustrates a back view of a handheld GNSS device including a display screen for a user according to embodiments of the invention.

As shown in FIG. 2 and FIG. 3, handheld GNSS device 100 may further include display 112 for displaying information to assist the user in positioning the device. Display 112 may be any electronic display such as a liquid crystal (LCD) display, light emitting diode (LED) display, and the like. Such display devices are well-known by those of ordinary skill in the art and any such device may be used. In the example shown by FIG. 2, display 112 is integral with the back side of the housing 102 of handheld GNSS device 100.

Handheld GNSS device 100 may further include a camera for recording still images or video. Such recording devices are well-known by those of ordinary skill in the art and any such device may be used. In the example illustrated in FIG. 1, front camera lens 110 is located on the front side of handheld GNSS device 100. A more detailed description of the positioning of front camera lens 110 is provided in U.S. patent application Ser. No. 12/571,244, filed Sep. 30, 2009, which is incorporated herein by reference in its entirety for all purposes. In one example, display 112 may be used to display the output of front camera lens 110.

Figure 4:
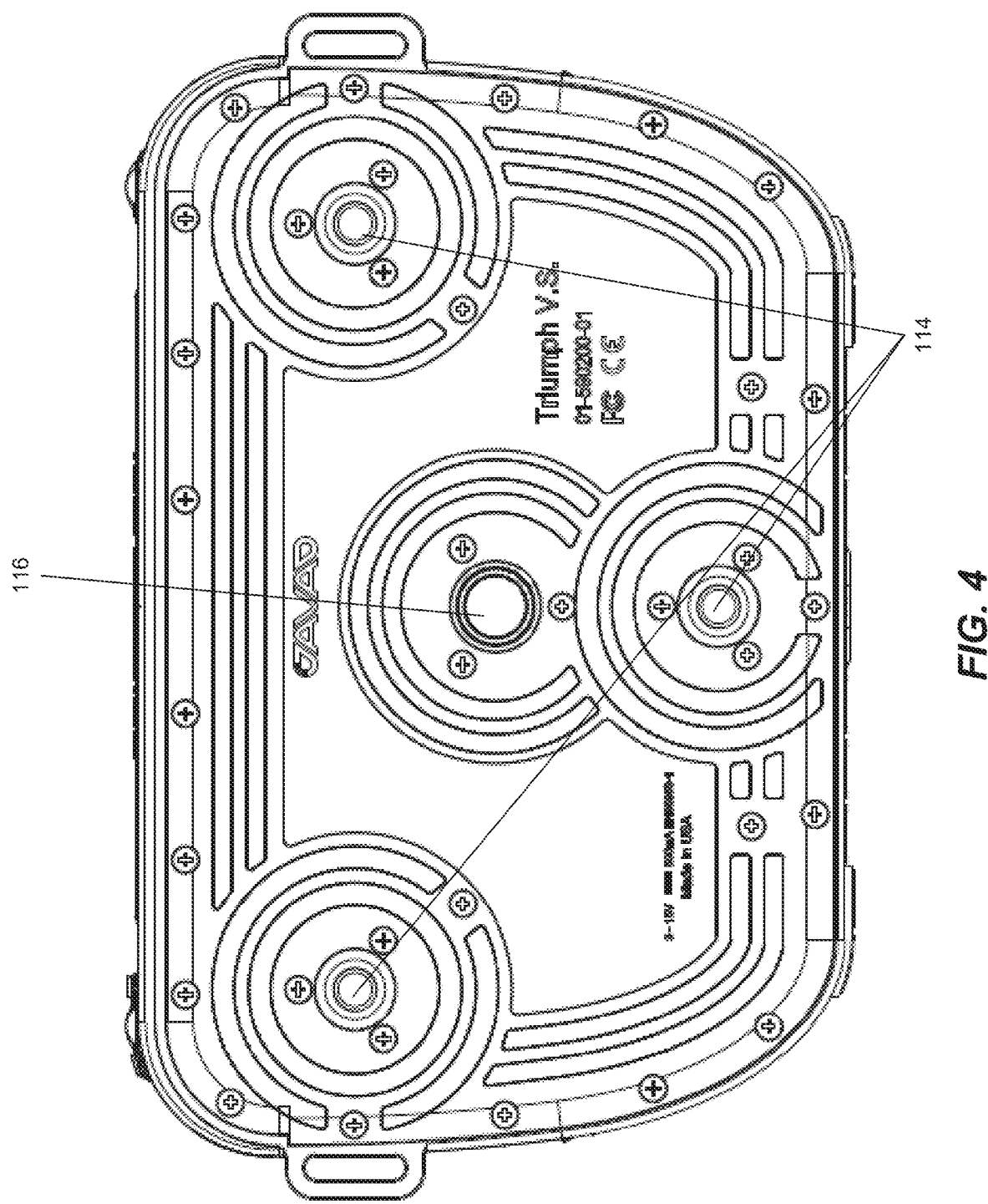
FIG. 4 illustrates a bottom view of a handheld GNSS device according to embodiments of the invention.

With reference to FIG. 4, handheld GNSS device 100 may also include a second bottom camera lens 116 on the bottom of handheld GNSS device 100 for viewing and alignment of the handheld GNSS device 100 with a point of interest marker. The image of the point of interest marker may also be recorded along with the GNSS data to ensure that the GNSS receiver 808 was mounted correctly, or compensate for misalignment later based on the recorded camera information.

Handheld GNSS device 100 may further include horizon sensors (not shown) for determining the orientation of the device. The horizon sensors may be any type of horizon sensor, such as an inclinometer, accelerometer, and the like. Such horizon sensors are well-known by those of ordinary skill in the art and any such device may be used. In one example, a representation of the output of the horizon sensors may be displayed using display 112. A more detailed description of display 112 is provided below. The horizon sensor information can be recorded along with GNSS data to later compensate for mis-leveling of the antenna.

Handheld GNSS device 100 may further include a distance sensor (not shown) to measure a linear distance. The distance sensor may use any range-finding technology, such as sonar, laser, radar, and the like. Such distance sensors are well-known by those of ordinary skill in the art and any such device may be used.

FIG. 4 illustrates a bottom view of the handheld GNSS device 100 according to embodiments of the invention. The handheld GNSS device 100 may be mounted on a tripod, or some other support structure, by a mounting structure such as three threaded bushes 114, in some embodiments of the invention.

FIG. 8 illustrates an exploded view of the handheld GNSS device 100. When assembled, GNSS antenna 802 is covered by the GNSS antenna cover 104, and the communication antennas 806 are covered by the communication antenna covers 106.

Figure 9A:
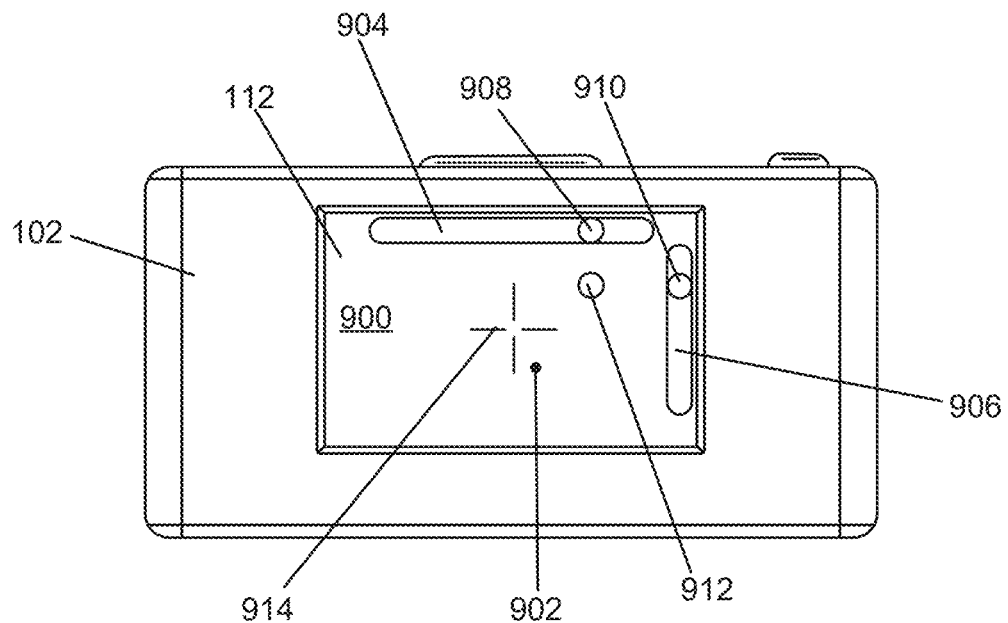
FIG. 9A illustrates an exemplary view of the display screen of a handheld GNSS device including elements used for positioning the device.

FIG. 9A illustrates an exemplary view 900 of display 112 for positioning handheld GNSS device 100. In one example, display 112 may display the output of camera. In this example, the display of the output of camera lens 116 or 110 includes point of interest marker 902. As shown in FIG. 9A, point of interest marker 902 is a small circular object identifying a particular location on the ground. In the examples provided herein, we assume that the location to be measured is located on the ground, and that the point of interest is identifiable by a visible marker (e.g., point of interest marker 902). The marker may be any object having a small height value. For instance, an "X" painted on the ground or a circular piece of colored paper placed on the point of interest may serve as point of interest marker 902.

In another example, display 112 may further include virtual linear bubble levels 904 and 906 corresponding to the roll and pitch of handheld GNSS device 100, respectively. Virtual linear bubble levels 904 and 906 may include virtual bubbles 908 and 910, which identify the amount and direction of roll and pitch of handheld GNSS device 100. Virtual linear bubble levels 904 and 906 and virtual bubbles 908 and 910 may be generated by a CPU 1108 and overlaid on the actual image output of the camera. In one example, positioning of virtual bubbles 908 and 910 in the middle of virtual linear bubble levels 904 and 906 indicate that the device is positioned "horizontally." As used herein, "horizontally" refers to the orientation whereby the antenna ground plane is parallel to the local horizon.

In one example, data from horizon sensors may be used to generate the linear bubble levels 904 and 906. For instance, sensor data from horizon sensors may be sent to CPU 1108 which may convert a scaled sensor measurement into a bubble coordinate within virtual linear bubble levels 904 and 906. CPU 1108 may then cause the display on display 112 of virtual bubbles 908 and 910 appropriately placed within virtual linear bubble levels 904 and 906. Thus, virtual linear bubble levels 904 and 906 may act like traditional bubble levels, with virtual bubbles 908 and 910 moving in response to tilting and rolling of handheld GNSS device 100. For example, if handheld GNSS device 100 is tilted forward, virtual bubble 908 may move downwards within virtual linear bubble level 906. Additionally, if handheld GNSS device 100 is rolled to the left, virtual bubble 908 may move to the right within virtual linear bubble level 904. However, since virtual linear bubble levels 904 and 906 are generated by CPU 1108, movement of virtual bubbles 908 and 910 may be programmed to move in any direction in response to movement of handheld GNSS device 100.

In another example, display 112 may further include planar bubble level 912. Planar bubble level 912 represents a combination of virtual linear bubble levels 904 and 906 (e.g., placed at the intersection of the virtual bubbles 908 and 910 within the linear levels 904 and 906) and may be generated by combining measurements of two orthogonal horizon sensors (not shown). For instance, scaled measurements of horizon sensors may be converted by CPU 1108 into X and Y coordinates on display 112. In one example, measurements from one horizon sensor may be used to generate the X coordinate and measurements from a second horizon sensor may be used to generate the Y coordinate of planar bubble level 912.

As shown in FIG. 9A, display 112 may further include central crosshair 914. In one example, central crosshair 914 may be placed in the center of display 112. In another example, the location of central crosshair 914 may represent the point in display 112 corresponding to the view of front camera lens 110 along optical axis 242. In yet another example, placement of planar bubble level 912 within central crosshair 914 may correspond to handheld GNSS device 100 being positioned horizontally. Central crosshair 914 may be drawn on the screen of display 112 or may be electronically displayed to display 112.

Display 112 may be used to aid the user in positioning handheld GNSS device 100 over a point of interest by providing feedback regarding the placement and orientation of the device. For instance, the camera output portion of display 112 provides information to the user regarding the placement of handheld GNSS device 100 with respect to objects on the ground. Additionally, virtual linear bubble levels 904 and 906 provide information to the user regarding the orientation of handheld GNSS device 100 with respect to the horizon. Using at least one of the two types of output displayed on display 112, the user may properly position handheld GNSS device 100 without the use of external positioning equipment.

In the example illustrated by FIG. 9A, both point of interest marker 902 and planar bubble level 912 are shown as off-center from central crosshair 914. This indicates that optical axis 242 of camera lens 110 or 116 is not pointed directly at the point of interest and that the device is not positioned horizontally. If the user wishes to position the device horizontally above a particular point on the ground, the user must center both planar bubble level 912 and point of interest marker 902 within central crosshair 914 as shown in FIG. 9B.

Figure 9B:
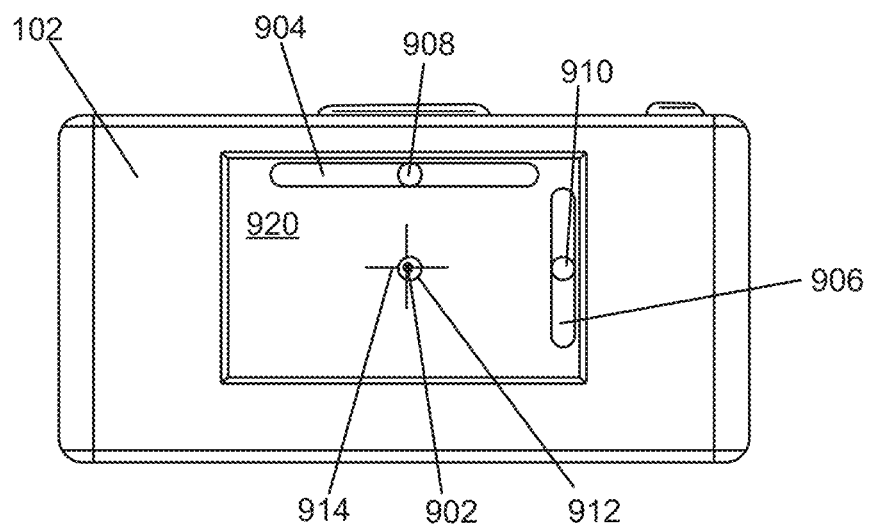
FIG. 9B illustrates another exemplary view of the display screen of a GNSS handheld device oriented horizontally and above a point of interest.

FIG. 9B illustrates another exemplary view 920 of display 112. In this example, virtual linear bubble levels 904 and 906 are shown with their respective virtual bubbles 908 and 910 centered, indicating that the device is horizontal. As such, planar bubble level 912 is also centered within central crosshair 914. Additionally, in this example, point of interest marker 902 is shown as centered within central crosshair 914. This indicates that optical axis 242 of front camera lens 110 is pointing towards point of interest marker 902. Thus, in the example shown by FIG. 9B, handheld GNSS device 100 is positioned horizontally above point of interest marker 902.

The bottom camera lens 116 or front camera lens 110 can be used to record images of a marker of a known configuration, a point of interest, placed on the ground. In one application, pixels and linear dimensions of the image are analyzed to estimate a distance to the point of interest. Using a magnetic compass or a MEMS gyro in combination with two horizon angles allows the three dimensional orientation of the GNSS handheld device 100 to be determined. Then, the position of the point of interest may be calculated based upon the position of the GNSS antenna 802 through trigonometry. In one embodiment, a second navigation antenna is coupled to the housing 102 of the GNSS handheld device 100 via an external jack 804 (FIG. 8). The second navigation antenna can be used instead of magnetic compass to complete estimation of full three-dimensional attitude along with two dimensional horizon sensors.

Estimation of a distance to a point of interest can be estimated as described in U.S. patent application Ser. No. 12/571,244, which is incorporated herein by reference for all purposes. The bottom camera lens 116 may also be used.

If the optical axis of the camera is not pointing directly at the point of interest, the misalignment with the survey mark can be recorded and compensated by analyzing the recorded image bitmaps.

Figure 10:
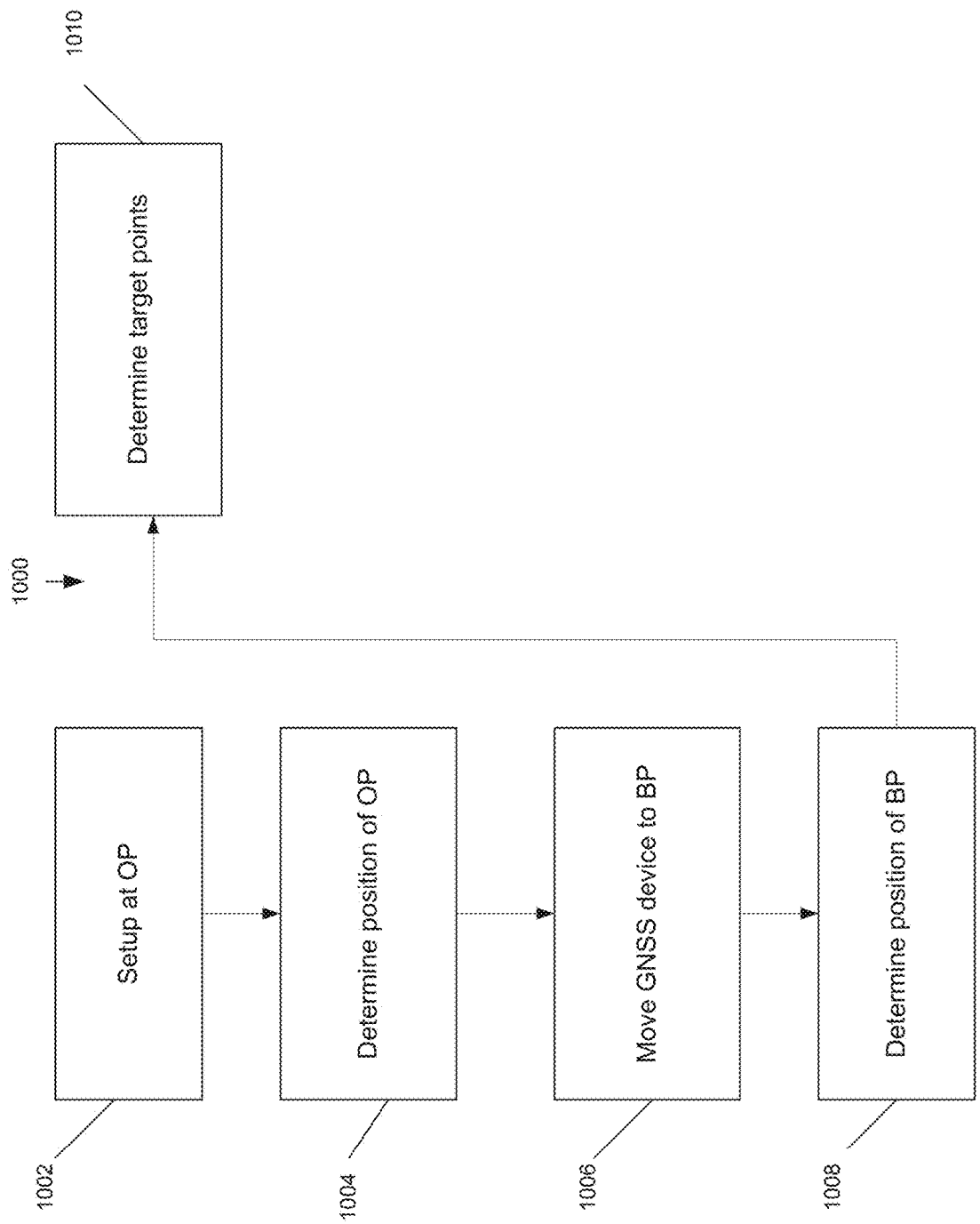
FIG. 10 illustrates a flowchart of a method for measuring position using a handheld GNSS device according to embodiments of the invention.

FIG. 10 illustrates an exemplary process 1000 for using a GNSS device and total station automatically together. A total station is an optical system to measure angle and distance from a known point to determine the location of the object targeted by the total station optical system. An encoder on the total station measures an angle, and in some cases, is calibrated to a known azimuth.

At block 1002, a tripod and tribrach, or other supports, are setup at the "Occupation Point" (OP). The total station is fit into the tribrach, for example by fitting the total station's legs in the tribrach. In one example, the GNSS device is fitted on top of the total station, for example using alignment legs to have your "Total Solution" station that combines the GNSS device and the total station. This is depicted in FIGS. 13A-13E, which depict various views of a GNSS device with a total station, such as GNSS device 100.

At block 1004, the GNSS device determines the accurate position of the OP and collects other relevant information from the user (e.g., setup and/or configuration data). This position is stored and optionally displayed on the screen (e.g., see FIG. 14E).

At block 1006, the GNSS device is moved (e.g., by lifting and carrying the GNSS device) to the "Back Point" (BP) while the camera of the total station robotically follows the "+" sign on the back of the GNSS device (see FIG. 17). The total station transmits the image data to GNSS device for optional display on the screen of the GNSS device. In some cases, the total station camera automatically focuses on the "+" sign on the GNSS device. In some cases, manual focus may override the automatic focus. While a "+" sign is used in this example, other recognizable marks may be used.

At block 1008, when the GNSS device reaches the BP, the GNSS device determines the position of the BP and the total station values are recorded. The azimuth from the OP to the BP is determined and is optionally used to calibrate the total station encoders (e.g., with 10 Sec accuracy).

At block 1010, the GNSS device is optionally moved back to the total station. The combined system can be used to measure any number of target points. Optionally, the total station can laser scan the area within the user-determined horizontal and vertical angle limits and create the 3-D image of the area and objects.

Alternatively, process 1000 can also include automatic sun seeking and calibrating feature of the total station with just a push of a button. The total station will automatically find the sun and use the azimuth to calibrate the encoders. In this example, the BP is not needed.

Figure 11:
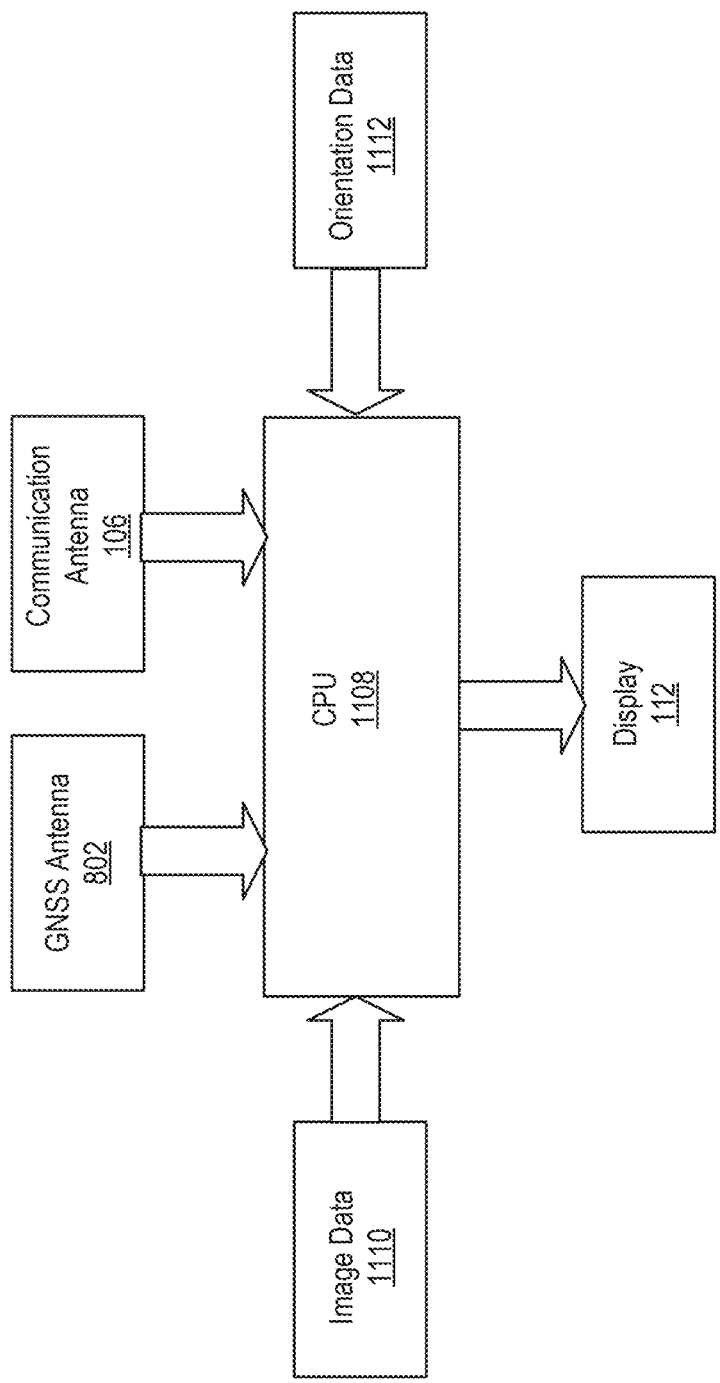
FIG. 11 illustrates a logic diagram showing the relationships between the various components of a handheld GNSS device according to embodiments of the invention.

FIG. 11 illustrates an exemplary logic diagram showing the relationships between the various components of handheld GNSS device 100. In one example, GNSS antenna 802 may send position data received from GNSS satellites to receiver 808. Receiver 808 may convert the received GNSS satellite signals into Earth-based coordinates, such as WGS84, ECEF, ENU, and the like. GNSS receiver 808 may further send the coordinates to CPU 1108 for processing along with position assistance data received from communication antennas 806. Communication antennas 806 are connected to a communication board 810. Orientation data 1112 may also be sent to CPU 1108. Orientation data 1112 may include pitch data from pitch horizon sensors and roll data from roll horizon sensors, for example. Image data 1110 from video or still camera may also be sent along to the CPU 1108 with the position data received by the GNSS antenna 802, positioning assistance data received by communication antenna 106, and orientation data 1112. Distance data from a distance sensor may also be used by CPU 1108. CPU 1108 processes the data to determine the position of the point of interest marker and provides display data to be displayed on display 112.

Figure 12:
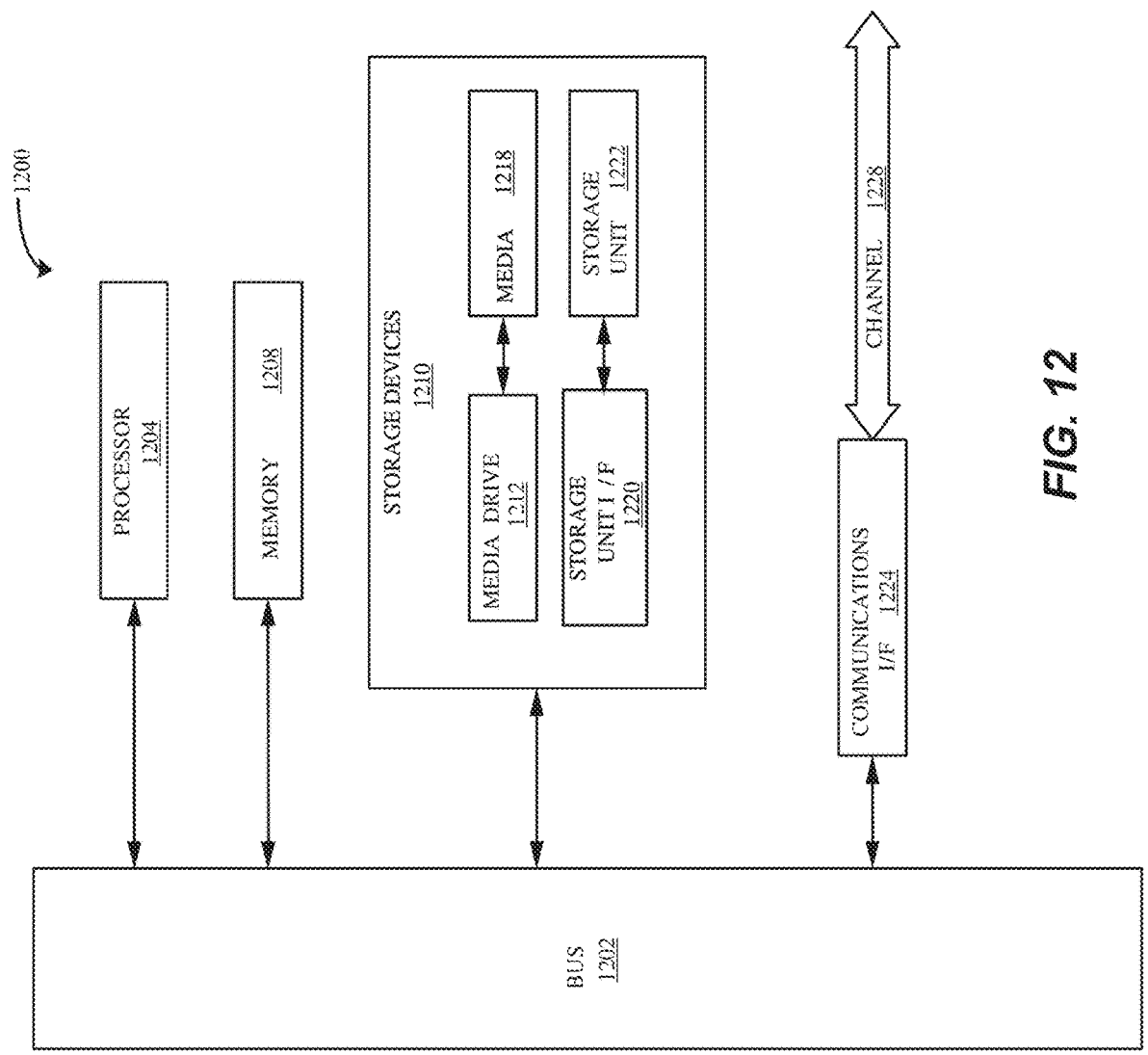
FIG. 12 illustrates a typical computing system that may be employed to implement some or all of the processing functionality in certain embodiments.

FIG. 12 illustrates an exemplary computing system 1200 that may be employed to implement processing functionality for various aspects of the current technology (e.g., as a GNSS device, receiver, CPU 1108, activity data logic/database, combinations thereof, and the like.). Those skilled in the relevant art will also recognize how to implement the current technology using other computer systems or architectures. Computing system 1200 may represent, for example, a user device such as a desktop, mobile phone, geodesic device, and so on as may be desirable or appropriate for a given application or environment. Computing system 1200 can include one or more processors, such as a processor 1204. Processor 1204 can be implemented using a general or special purpose processing engine such as, for example, a microprocessor, microcontroller or other control logic. In this example, processor 1204 is connected to a bus 1202 or other communication medium.

Computing system 1200 can also include a main memory 1208, such as random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 may likewise include a read only memory ("ROM") or other static storage device coupled to bus 1202 for storing static information and instructions for processor 1204.

The computing system 1200 may also include information storage mechanism 1210, which may include, for example, a media drive 1212 and a removable storage interface 1220. The media drive 1212 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1218 may include, for example, a hard disk, floppy disk, magnetic tape, optical disk, CD or DVD, or other fixed or removable medium that is read by and written to by media drive 1212. As these examples illustrate, the storage media 1218 may include a computer-readable storage medium having stored therein particular computer software or data.

In alternative embodiments, information storage mechanism 1210 may include other similar instrumentalities for allowing computer programs or other instructions or data to be loaded into computing system 1200. Such instrumentalities may include, for example, a removable storage unit 1222 and an interface 1220, such as a program cartridge and cartridge interface, a removable memory (for example, a flash memory or other removable memory module) and memory slot, and other removable storage units 1222 and interfaces 1220 that allow software and data to be transferred from the removable storage unit 1222 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a USB port), a PCMCIA slot and card, etc. Software and data transferred via communications interface 1224. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 1208, storage media 1218, or removable storage unit 1222. These and other forms of computer-readable media may be involved in providing one or more sequences of one or more instructions to processor 1204 for execution. Such instructions, generally referred to as "computer program code" (which may be grouped in the form of computer programs or other groupings), when executed, enable the computing system 1200 to perform features or functions of embodiments of the current technology.

In an embodiment where the elements are implemented using software, the software may be stored in a computer-readable medium and loaded into computing system 1200 using, for example, removable storage drive 1222, media drive 1212 or communications interface 1224. The control logic (in this example, software instructions or computer program code), when executed by the processor 1204, causes the processor 1204 to perform the functions of the technology as described herein.

Figure 13A:
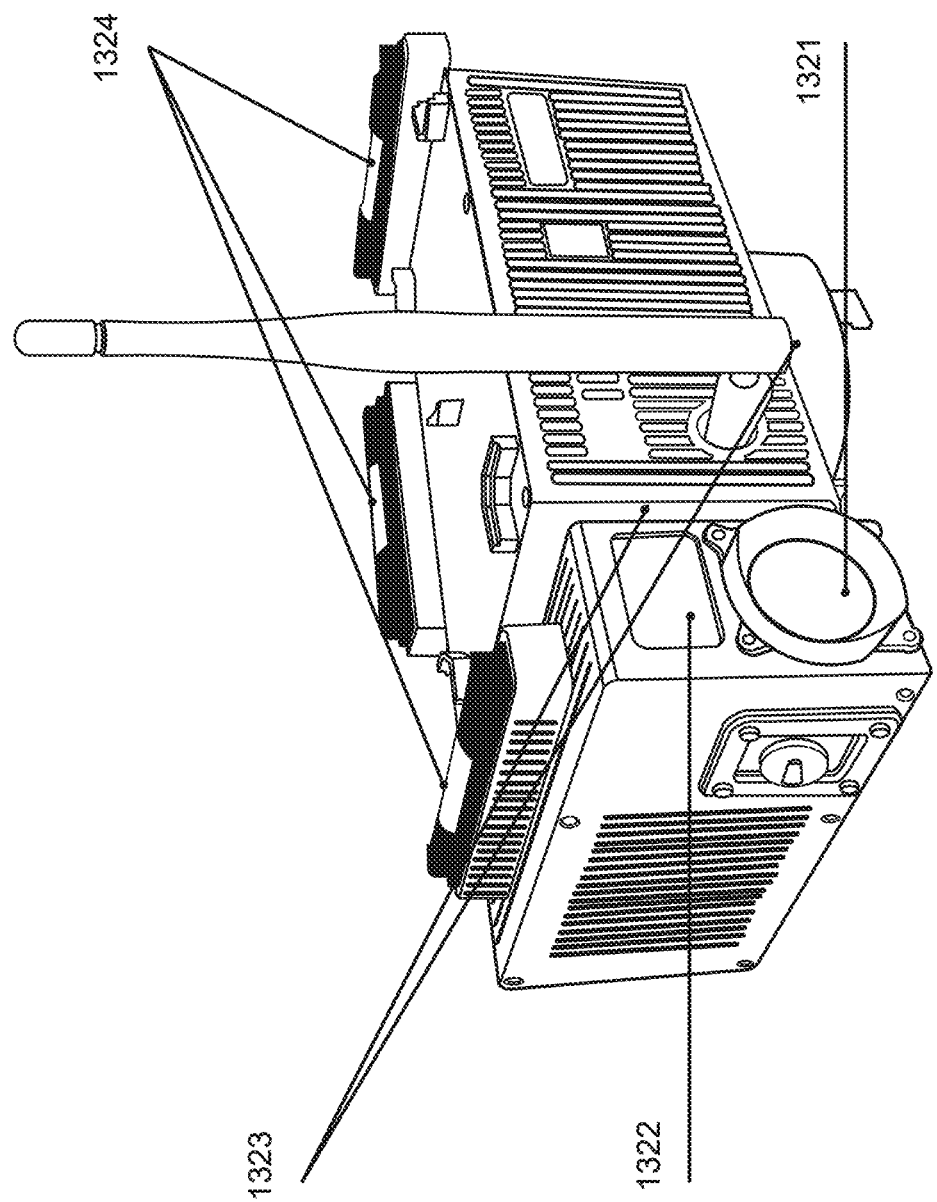
FIG. 13A depict various views of an exemplary total station coupled with and without an exemplary GNSS device.

FIGS. 13A-13E depict various views of an exemplary total station coupled with and without an exemplary GNSS device. FIG. 13A illustrates an exemplary total station 1301 (e.g. "J-Mate"). A total station is an optical system to measure angle and distance from a known point to determine the location of the object targeted by the total station optical system. In some embodiments, the total station 1301 comprises a camera 1321 that automatically identifies targets in its field of view; a laser module 1322 that measures the distance between the total station and targets by scanning and examining the areas around the intended targets to ensure reliable identification and measurement; two motors 1323 that rotate the camera portion of the total station vertically and rotate the main portion of the total station horizontally; precision encoders that measure that vertical and horizontal angles to the target; and precision level vials 1324 that indicate whether the main portion of the total station or the camera portion are level with the ground.

In some embodiments, the axis of the laser module 1322 (e.g., the light propagation axis) and the axis of the camera 1321 (e.g., the optical axis of the lens) need to be aligned. Conventionally, the calibration of the alignment is performed by the manufacturer of the total station unit (e.g., in a factory before the total station unit is purchased by a user). In some embodiments, the total station 1301 allows the user to calibrate the alignment after purchasing the total station unit at any time without the assistance of the manufacturer. This way, the user does not need to send the total station unit to the manufacturer for re-calibration.

Figure 19:
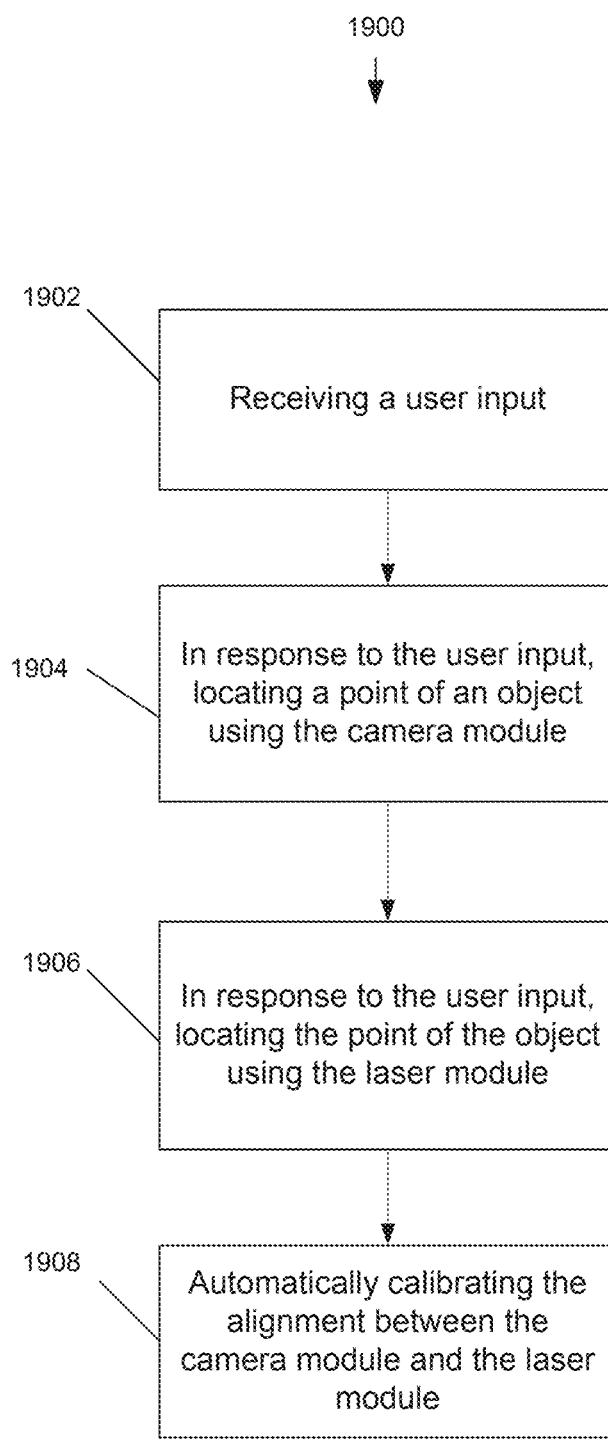
FIG. 19 illustrates an exemplary process for calibrating the alignment between a camera module and a laser module of a total station.

FIG. 19 illustrates an exemplary process 1900 for calibrating the alignment between a laser module (e.g., laser module 1322) and a camera module (e.g., camera 1321) of a total station, in accordance with some embodiments of the invention. In some embodiments, the method can be triggered in response to a user input, for example, a selection of a hardware button or a software button corresponding to the calibration functionality. In some embodiments, the method can be triggered when certain conditions are met (e.g., when misalignment between the camera module and the laser module is detected).

At block 1902, the total station receives a user input. In some embodiments, the user input is indicative of a selection of the calibration functionality. In some embodiments, the user input can comprise a selection of a hardware button or a software button corresponding to the calibration functionality.

At block 1904, in response to the user input, the total station automatically locates a point (e.g., the center point) of an object using the camera module of the total station. For example, the total station moves the camera (e.g., using motors such as motors 1323) such that the point (e.g., the center point) of the object is at the center of the camera screen. The orientation information of the camera (e.g., horizontal and vertical angles) is recorded by the total station.

In some embodiments, the object used in process 1900 is a QR image. Any object having a distinct view (e.g., having a clear outline such that a particular point on the object can be identified) can be used.

At block 1906, in response to the user input, the total station automatically locates the same point (e.g., the center point) of the same object using the laser module of the total station. For example, the total station moves the laser module (e.g., using motors such as motors 1323) to bring the laser beam to coincide with the point (e.g., the center point) of the object. The orientation information of the laser module (e.g., horizontal and vertical angles) is recorded by the total station.

At block 1908, the total station automatically calibrates the alignment between the camera module and the laser module based on the recorded orientation information in blocks 1904 and 1906. Specifically, the difference between the recorded orientation information in blocks 1904 and 1906 is used for calibration and alignment (compensation) of the camera module and the laser module. Accordingly, the total station adjusts the cross-hair view of the camera to match that of the propagation axis of the laser module.

Figure 13B:
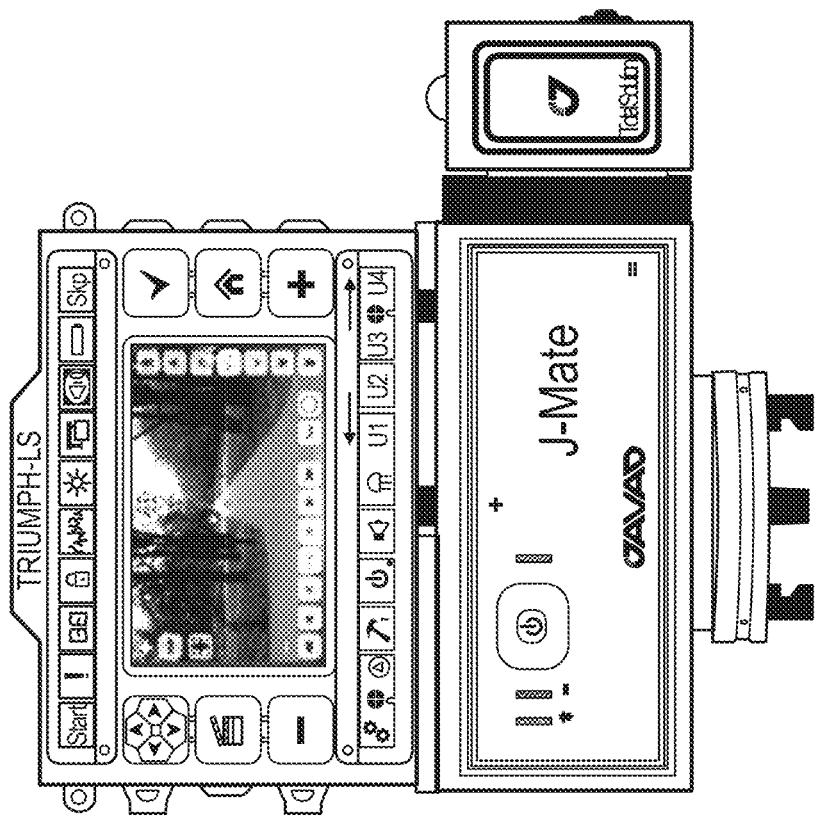
FIG. 13B depict various views of an exemplary total station coupled with and without an exemplary GNSS device.
Figure 13C:
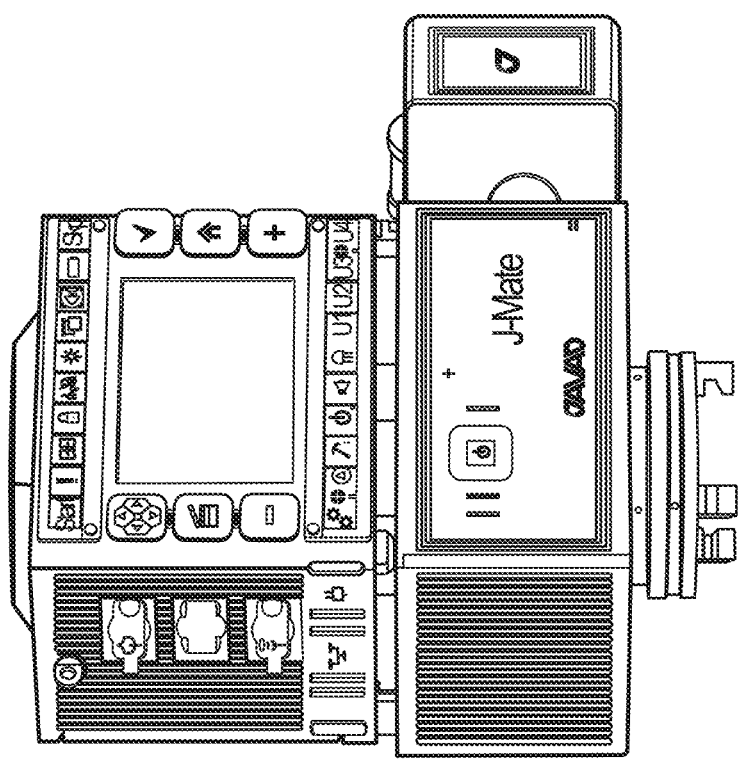
FIG. 13C depict various views of an exemplary total station coupled with and without an exemplary GNSS device.
Figure 13D:
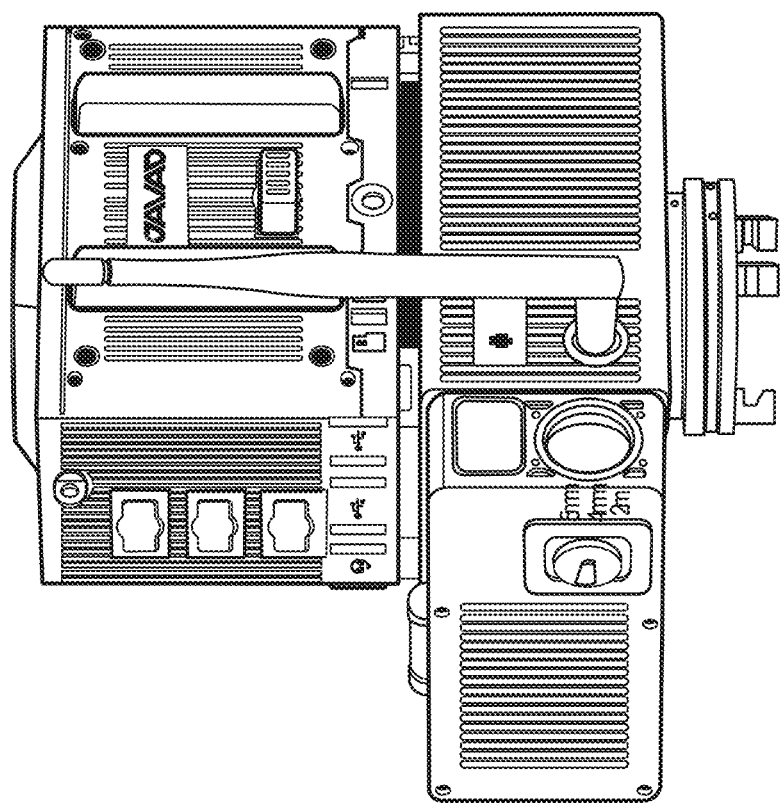
FIG. 13D depict various views of an exemplary total station coupled with and without an exemplary GNSS device.

FIGS. 13B-13D illustrate various views of an exemplary total station coupled with an exemplary GNSS device. In some embodiments, the coupled system 1302 comprises an exemplary total station 1301 (e.g. "J-Mate") secured on top of a tripod 1331 that stands on the ground, and an exemplary GNSS device 100 (e.g. "TRIUMPH-LS") secured on top of the total station 1301 by registering a mounting structure such as three threaded bushes 114 from the bottom of the GNSS device 100 to the matching features on the top of the total station 1301. The display 112 displays the view from the camera 1321.

Figure 13E:
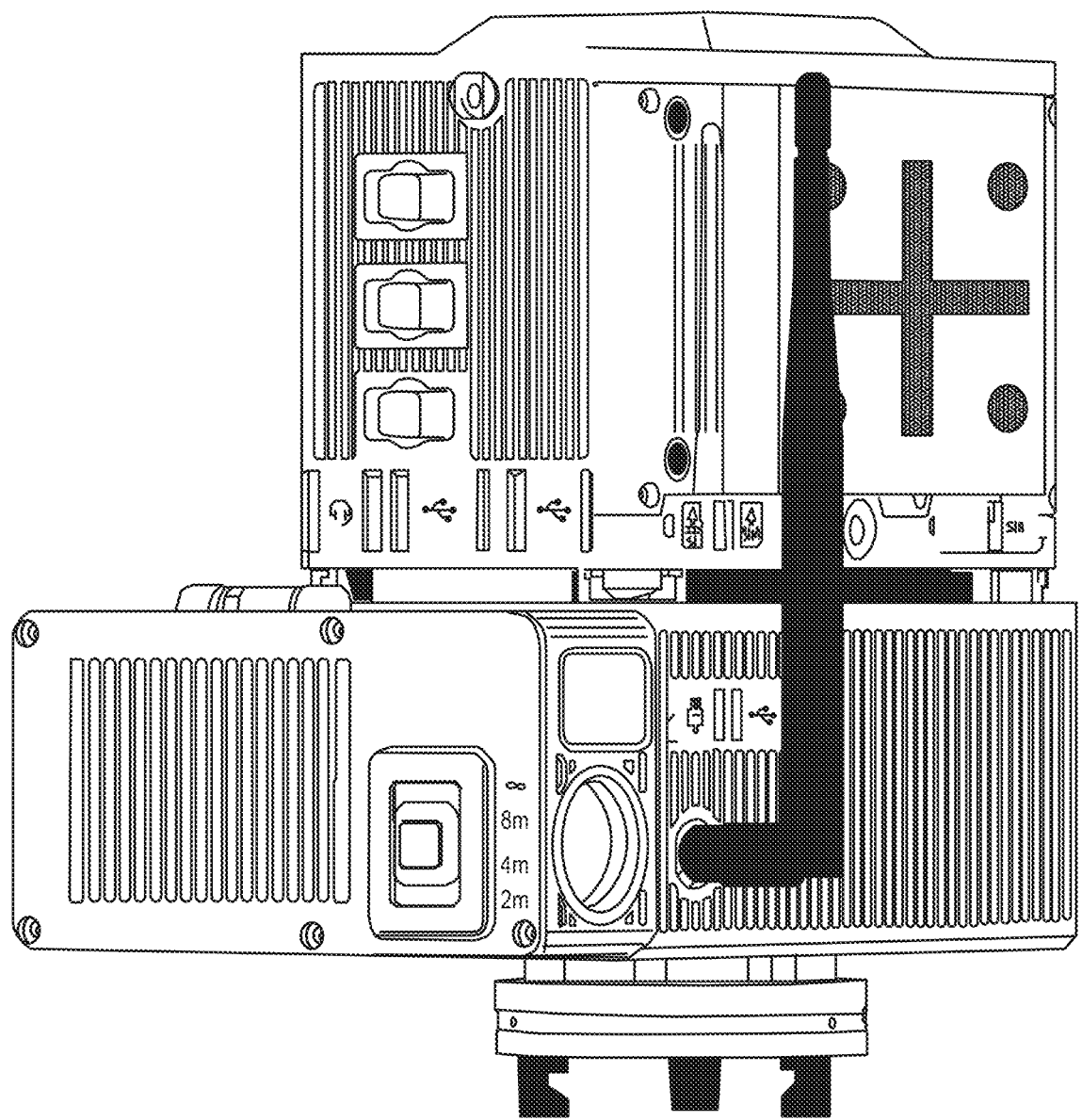
FIG. 13E depict various views of an exemplary total station coupled with and without an exemplary GNSS device.

FIG. 13E illustrates a view 1303 of an exemplary total station coupled with an exemplary GNSS device and an exemplary plus sign target. In some embodiments, the augmented coupled system 1303 comprises the coupled system 1302 and a plus sign target 1333 attached to the GNSS device 100.

In some embodiments, a user of the total station 1301 establishes its position and calibrates its vertical and horizontal encoders before measuring previously unknown points. The calibration comprises an automated process that is an improvement over processes performed in conventional total stations. Methods of calibration include: backsighting, resecting, and astro-seeking. After the total station 1301 has been calibrated, the user can optionally measure previously unknown points or perform a stakeout.

Figure 14A:
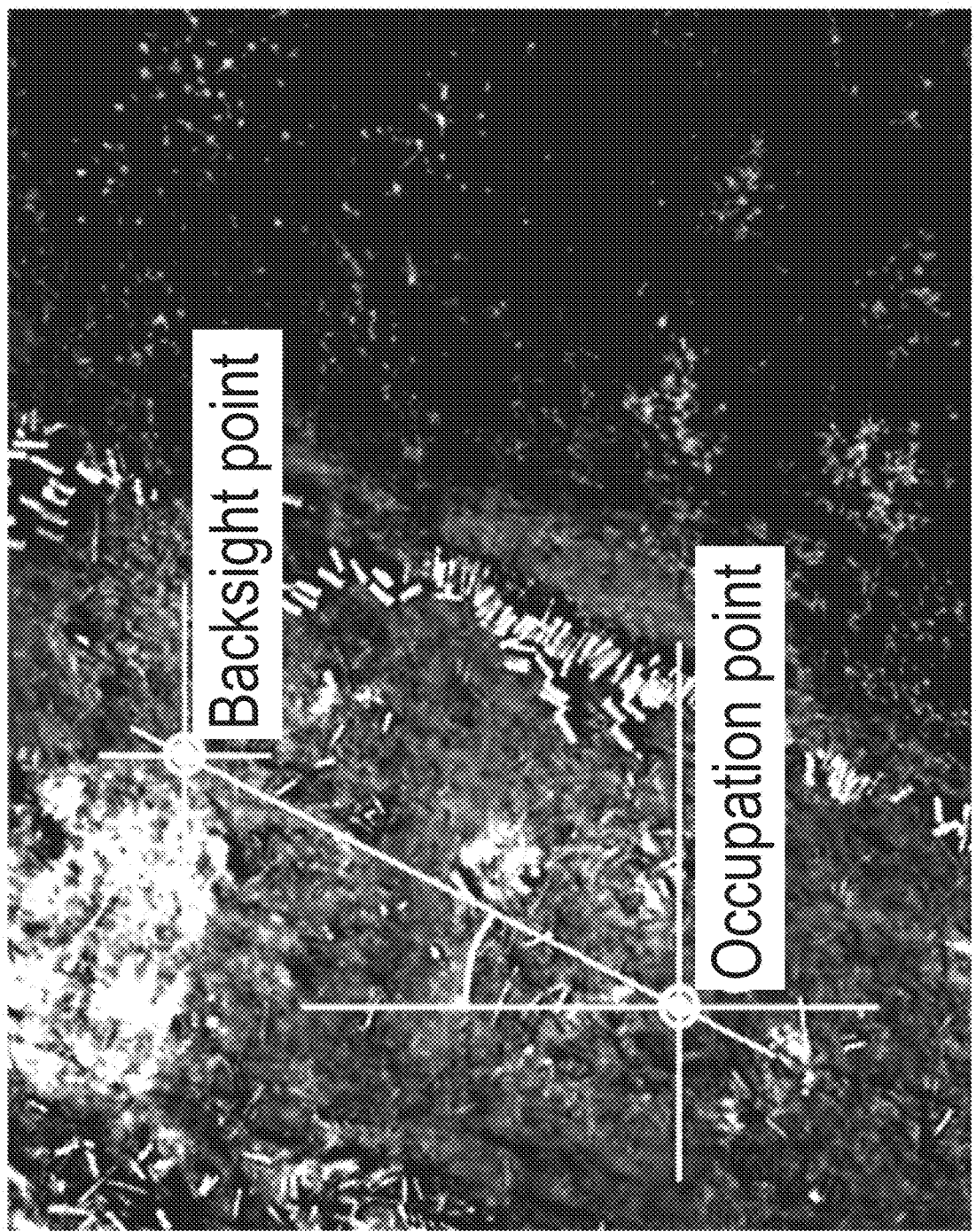
FIG. 14A illustrates an occupation point and a backsight point during backsight calibration.

If GNSS signals are available at the job site of interest, the user may optionally use backsighting to calibrate the total station 1301. During backsight calibration, GNSS measurements are taken at two locations around the job site, an occupation point (OP) 1411 and a backsight point (BP) 1413, as shown in FIG. 14A. In some embodiments, a suitable choice for a backsight point is one that is in line of sight with the occupation point.

Figure 14C:
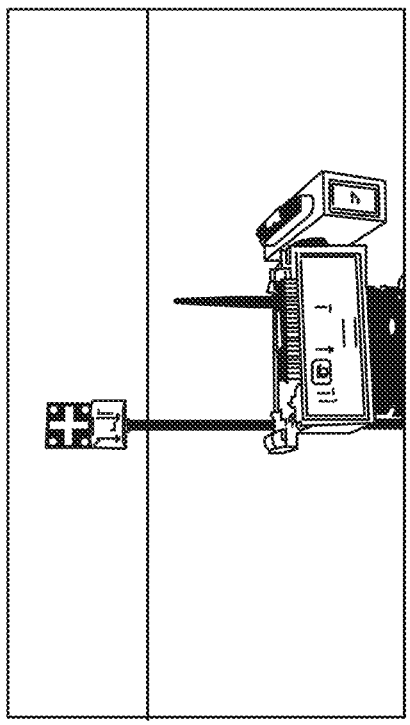
FIG. 14C depict various stages of backsight calibration.
Figure 14E:
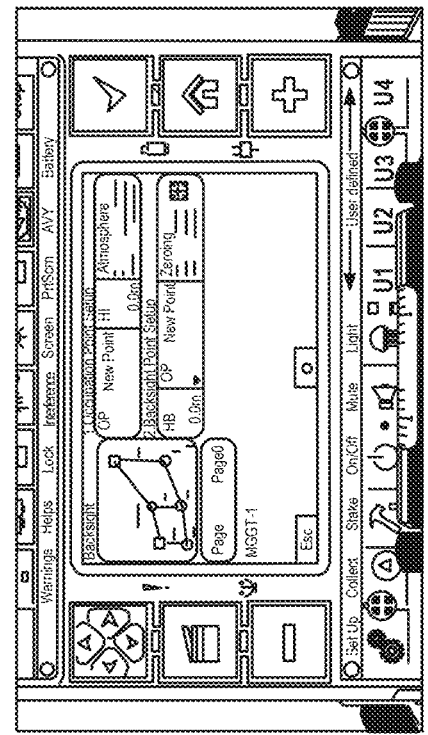
FIG. 14E depict various stages of backsight calibration.
Figure 14B:
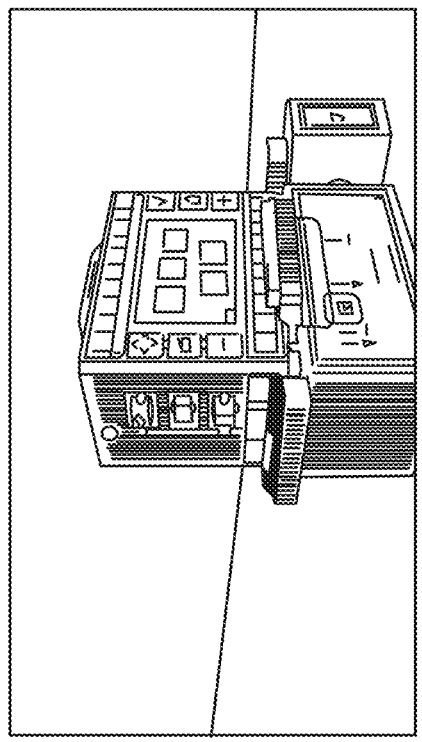
FIG. 14B depict various stages of backsight calibration.
Figure 14D:
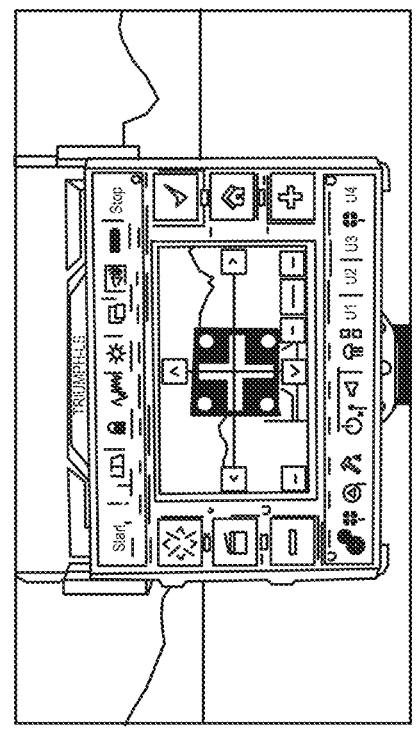
FIG. 14D depict various stages of backsight calibration.
Figure 14F:
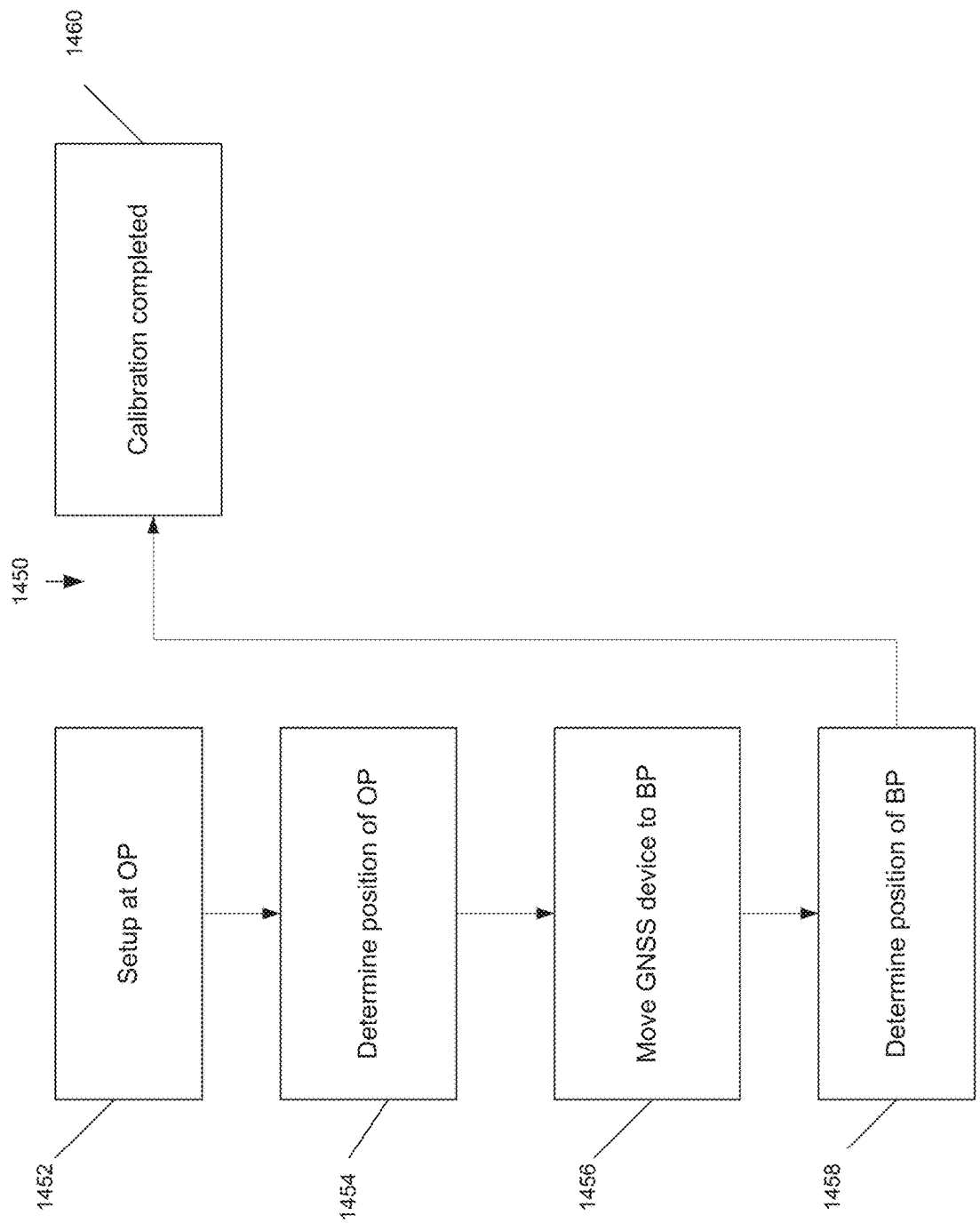
FIG. 14F illustrates an exemplary process for using a GNSS device and total station automatically together for backsight calibration.

FIG. 14F illustrates an exemplary process 1450 for using a GNSS device and total station automatically together for backsight calibration. An encoder on the total station measures an angle, and in some cases, is calibrated to a known azimuth. At block 1452, a tripod 1331 and tribrach 1331, or other supports, are setup at the occupation point 1411. The total station 1301 is fit into the tribrach 1331, for example by fitting the total station's legs in the tribrach. In one example, the GNSS device 101 is fitted on top of the total station 1301, for example using alignment legs 114 to have a "total solution" combination of the GNSS device 101 and the total station 1301, as shown in FIG. 14B. This is depicted in FIGS. 13A-13E, which depict various views of a GNSS device 100 with a total station 1301.

At block 1454, the GNSS device 101 determines the accurate position of the occupation point 1411 and collects other relevant information from the user (e.g., setup and/or configuration data). In some embodiments, the RTK Survey feature of the GNSS device 100 quickly determines the accurate location of the occupation point 1411. The user may optionally use a custom base station or any public RTN. This position is stored and optionally displayed on the screen (e.g., see FIG. 14E).

At block 1456, the user slides the plus ("+") sign target 1333 on top of the GNSS device 100, physically separates the GNSS device 100 and plus sign target combination from the total station 1301, and moves (e.g., by lifting and carrying the GNSS device 101) the combination to the backsight point 1413, as shown in FIG. 14C. In some embodiments, the camera 1321 of the total station 1301 robotically follows the plus sign target 1333. The total station 1301 transmits the image data to the GNSS device 101 for optional display on the screen 112 of the GNSS device 101, as shown in FIG. 14D. In some cases, the total station camera automatically focuses on the plus sign on the GNSS device. This allows the user to confirm that the camera 1321 is following the plus sign target 1333. In some embodiments, if the camera 1321 loses sight of the plus sign target 1333, the user may remotely control the camera 1321 to so that the plus sign target 1333 is back in view. In some cases, manual focus may override the automatic focus. While a plus ("+") sign is used in this example, other recognizable marks may be used in some embodiments.

At block 1458, when the GNSS device 101 reaches the backsight point 1413, the GNSS device 101 determines the position of the backsight point 1413 and the position is recorded. The azimuth from the occupation point 1411 to the backsight point 1413 is determined and is optionally used to calibrate the total station encoders (e.g., with 10-second precision). As shown in FIG. 14E, various information about occupation point 1411 and backsight point 1413 is displayed.

At block 1460, the total station 1301 is now calibrated and ready to measure unknown locations. In some embodiments, the measurements of one of more other backsight points are made to improve the precision of the calibration. In some embodiments, if the tripod is disturbed after this calibration is complete, an LED indicator on the front of the total station 1301 will blink to show that re-calibration is required. The user may optionally replace the GNSS device 100 on top of the total station 1301 at the occupation point 1411 and proceed to measure as many target points as the job requires. In some embodiments, the GNSS device 100 is henceforth used as a controller that the user may hold in his or her hand.

Figure 15A:
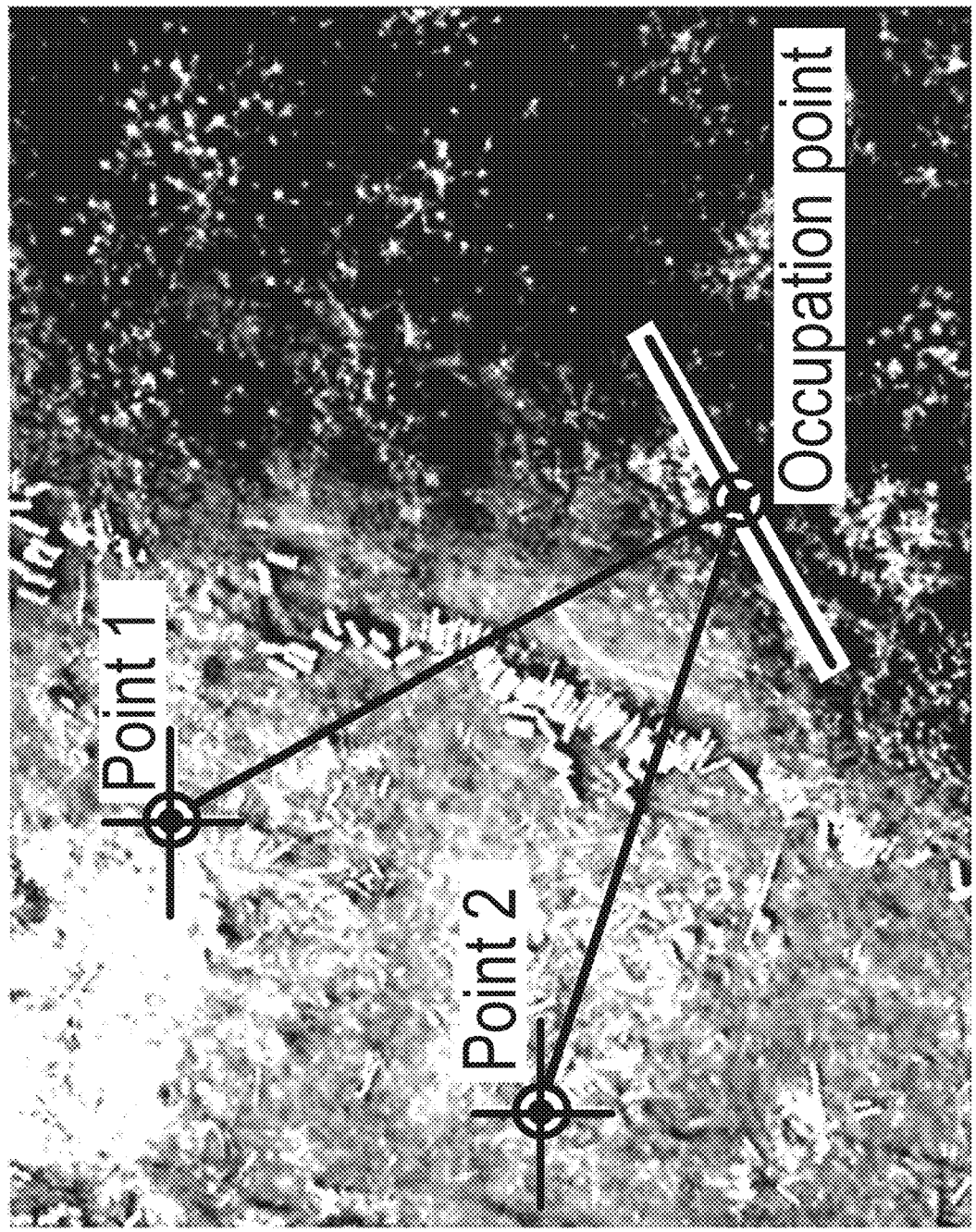
FIG. 15A illustrates an occupation point and two known points during reset calibration.

In some embodiments, if GNSS signals are not available at the occupation point 1411, the user may optionally use resecting to calibrate the total station 1301. During resecting calibration, location information from two known points, point 1 1513 and point 2 1515, and their distances and orientation from occupation point 1411 are used to establish accurate position information about the occupation point 1411 and to calibrate the encoders of the total station 1301, as shown in FIG. 15A. In some embodiments, a suitable choice for a set of backsight points has both points in line of sight with the occupation point.

Figure 15B:
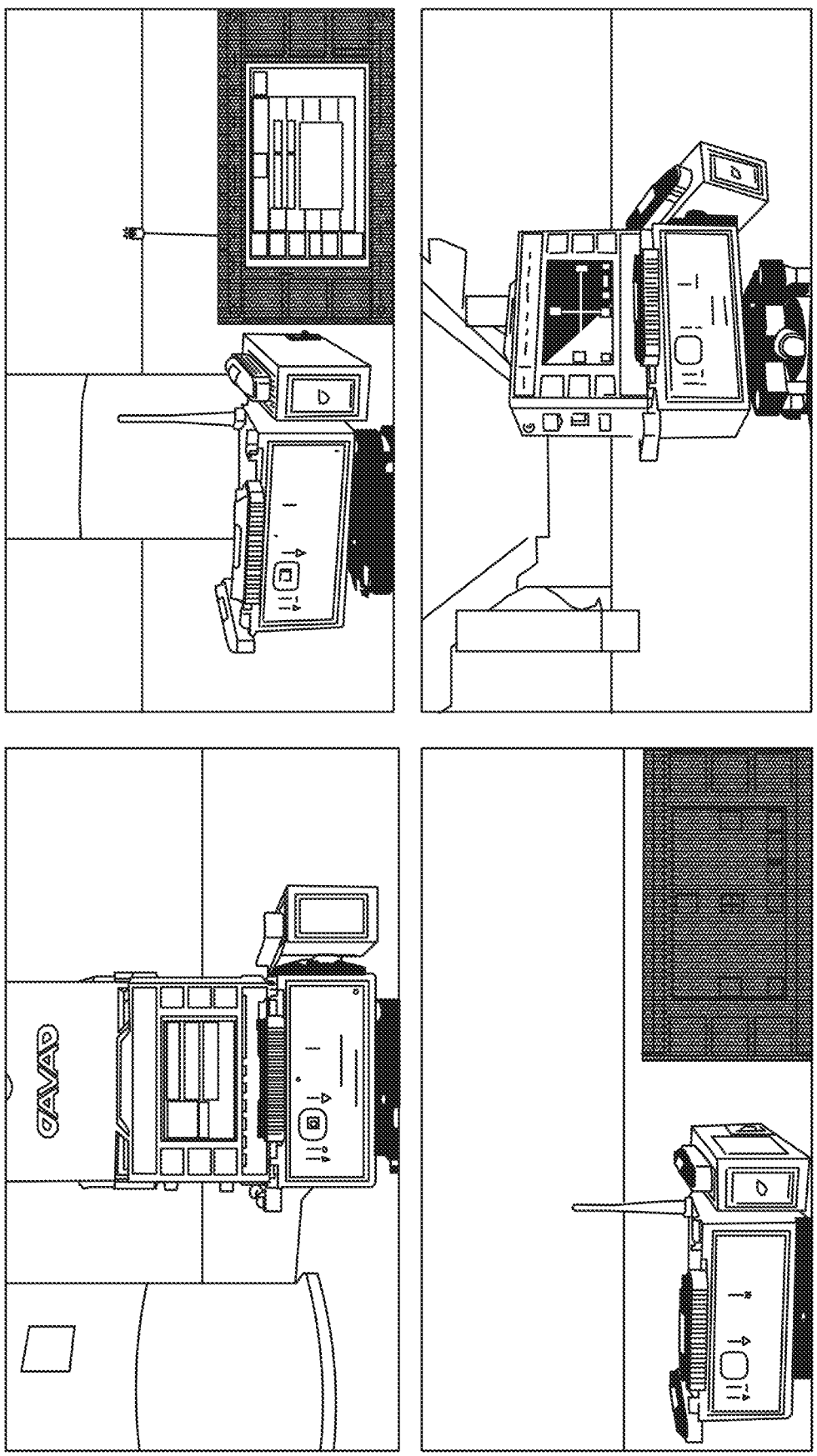
FIG. 15B depicts various stages of reset calibration.
Figure 15C:
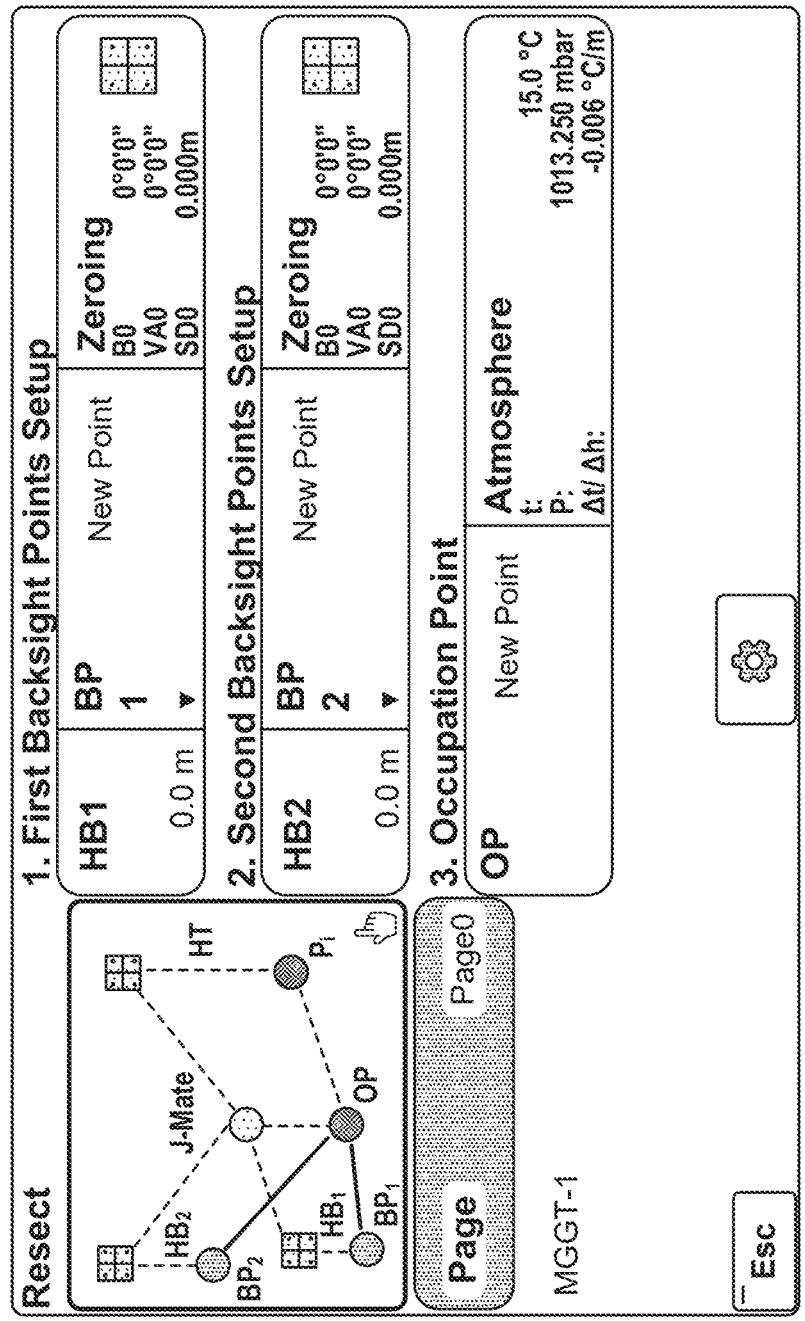
FIG. 15C illustrates various information about an occupation point and two known points during reset calibration.
Figure 15D:
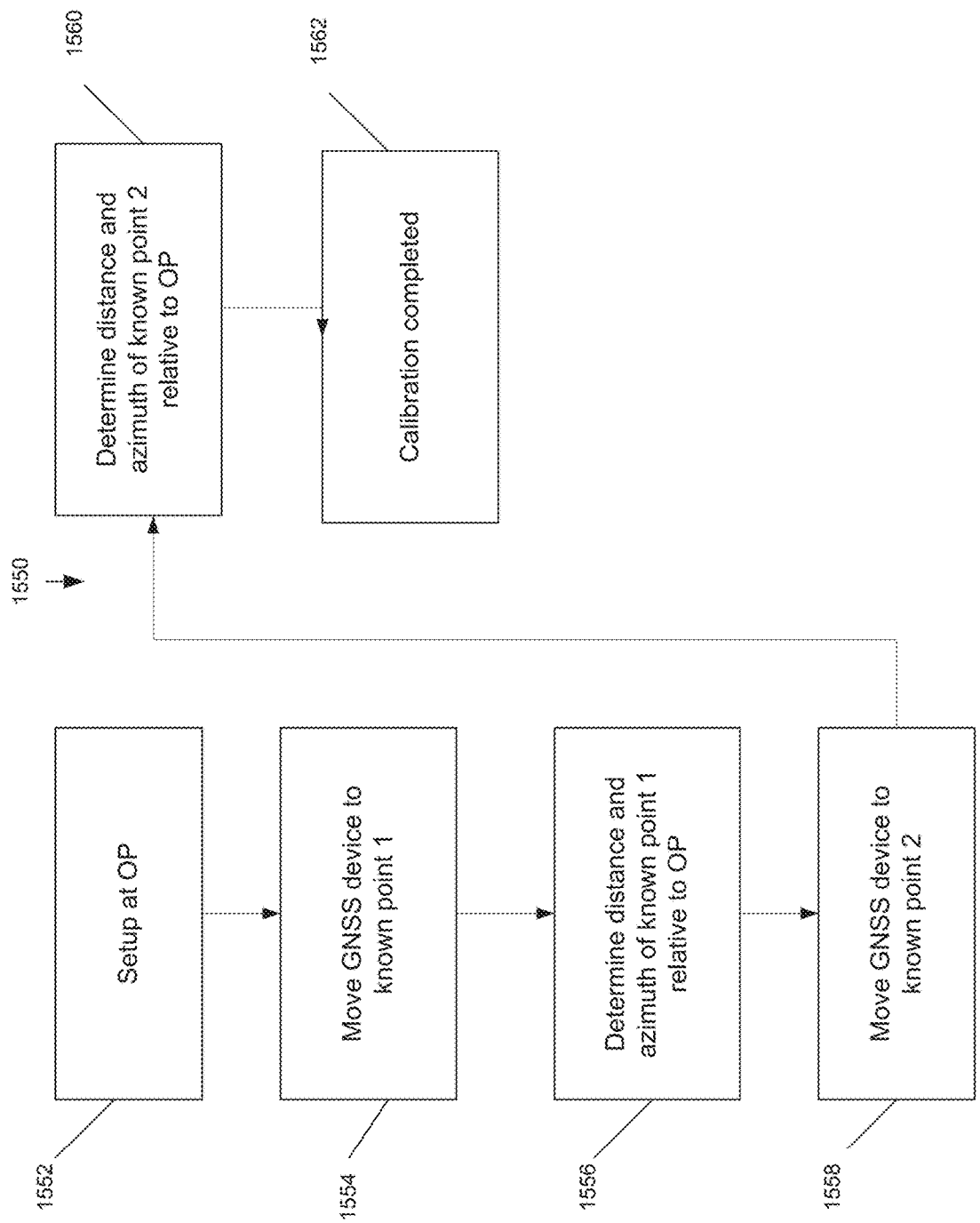
FIG. 15D illustrates an exemplary process for using a GNSS device and total station automatically together for reset calibration.

FIG. 15D illustrates an exemplary process 1550 for using a GNSS device 101 and total station automatically together for resect calibration. An encoder on the total station measures an angle, and in some cases, is calibrated to a known azimuth. At block 1552, a tripod 1331 and tribrach 1331, or other supports, are setup at the occupation point 1411. The total station 1301 is fit into the tribrach 1331, for example by fitting the total station's legs in the tribrach. In one example, the GNSS device 101 is fitted on top of the total station 1301, for example using alignment legs 114 to have a "total solution" combination of the GNSS device 101 and the total station 1301, as shown in FIG. 14B. This is depicted in FIGS. 13A-13E, which depict various views of a GNSS device 100 with a total station 1301.

At block 1554, the user slides the plus ("+") sign target 1333 on top of the GNSS device 100, physically separates the GNSS device 100 and plus sign target combination from the total station 1301, and moves (e.g., by lifting and carrying the GNSS device 101) the combination to the known point 1 1513, as shown in FIG. 14C. In some embodiments, the camera 1321 of the total station 1301 robotically follows the plus sign target 1333. The total station 1301 transmits the image data to the GNSS device 101 for optional display on the screen 112 of the GNSS device 101, as shown in FIG. 14D. In some cases, the total station camera automatically focuses on the plus sign on the GNSS device. This allows the user to confirm that the camera 1321 is following the plus sign target 1333. In some cases, manual focus may override the automatic focus. While a plus ("+") sign is used in this example, other recognizable marks may be used in some embodiments.

At block 1556, when the GNSS device 101 reaches the known point 1 1513, the GNSS device 101 determines the distance and azimuth from the occupation point 1411 to the known point 1 1513 and this information is recorded. At block 1558, the user moves the combination of the GNSS device 101 and the plus sign target 1333 to the known point 2 1515. At block 1560, when the GNSS device 101 reaches the known point 2 1515, the GNSS device 101 determines the distance and azimuth from the occupation point 1411 to the known point 2 1515 and this information is recorded.

FIG. 15B depicts various stages of resect calibration. As shown in FIG. 15C, various information about occupation point 1411, known point 1 1513 (e.g. "first backsight point"), and known point 2 1515 (e.g. "second backsight point") is displayed. At block 1562, the total station 1301 is now calibrated and ready to measure unknown locations.

Figure 16A:
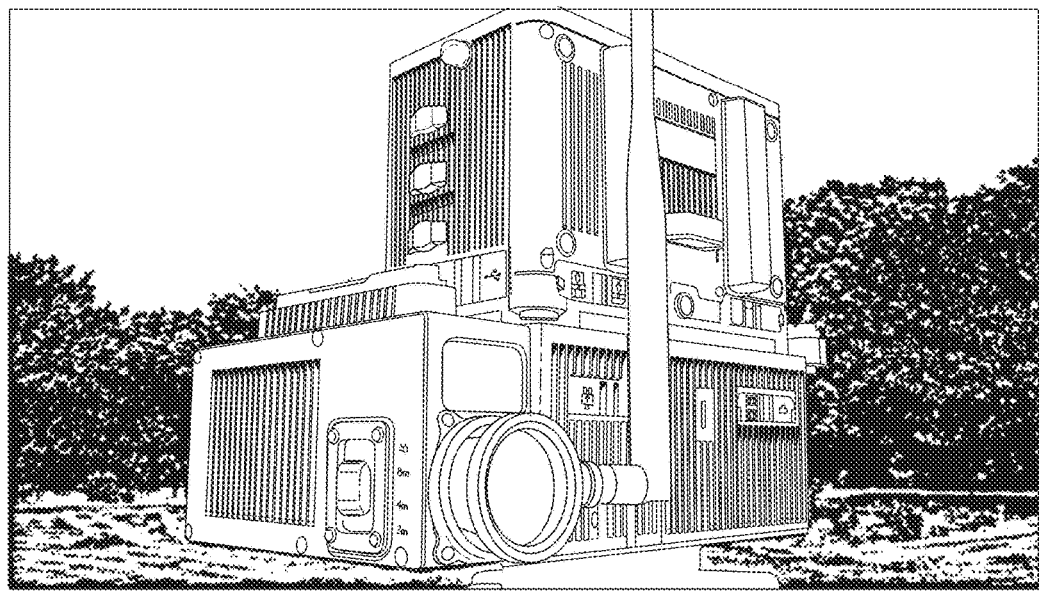
FIG. 16A depicts various stages of astro-seek calibration.
Figure 16B:
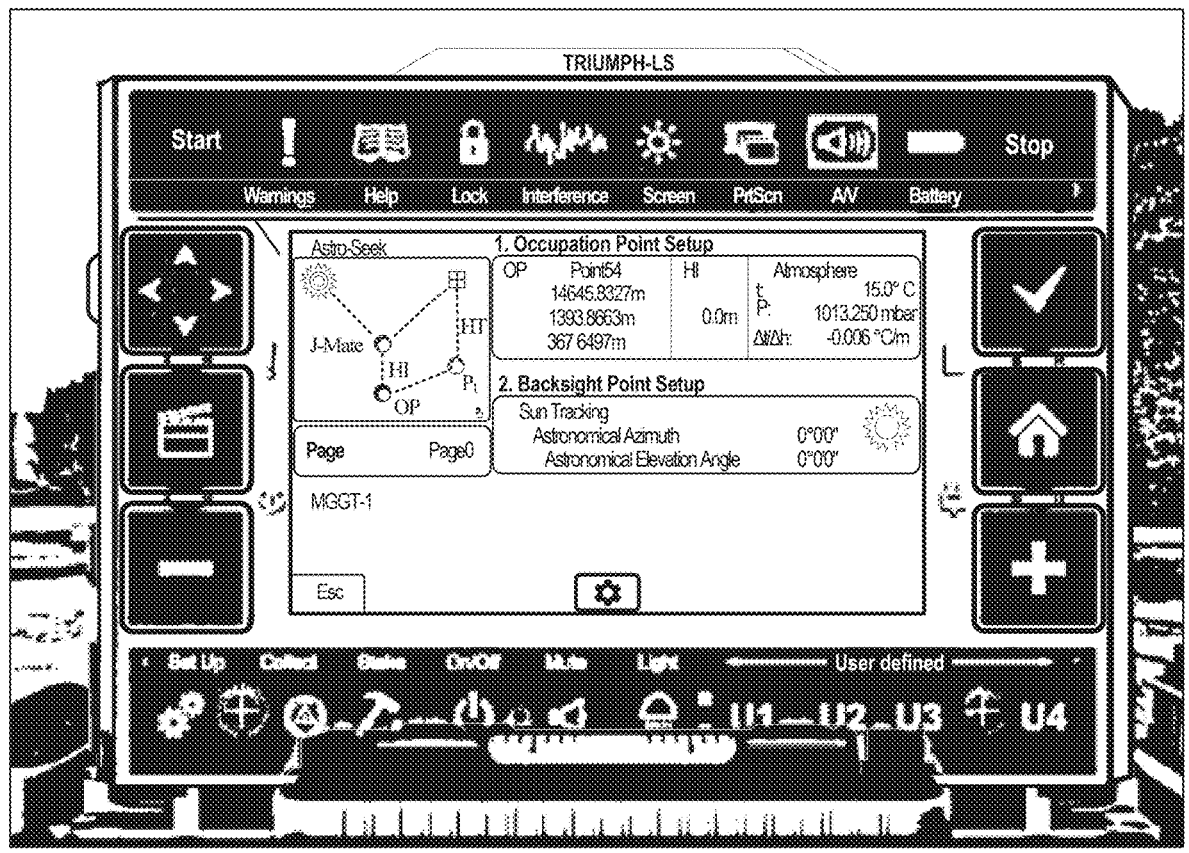
FIG. 16B depicts various stages of astro-seek calibration.
Figure 16C:
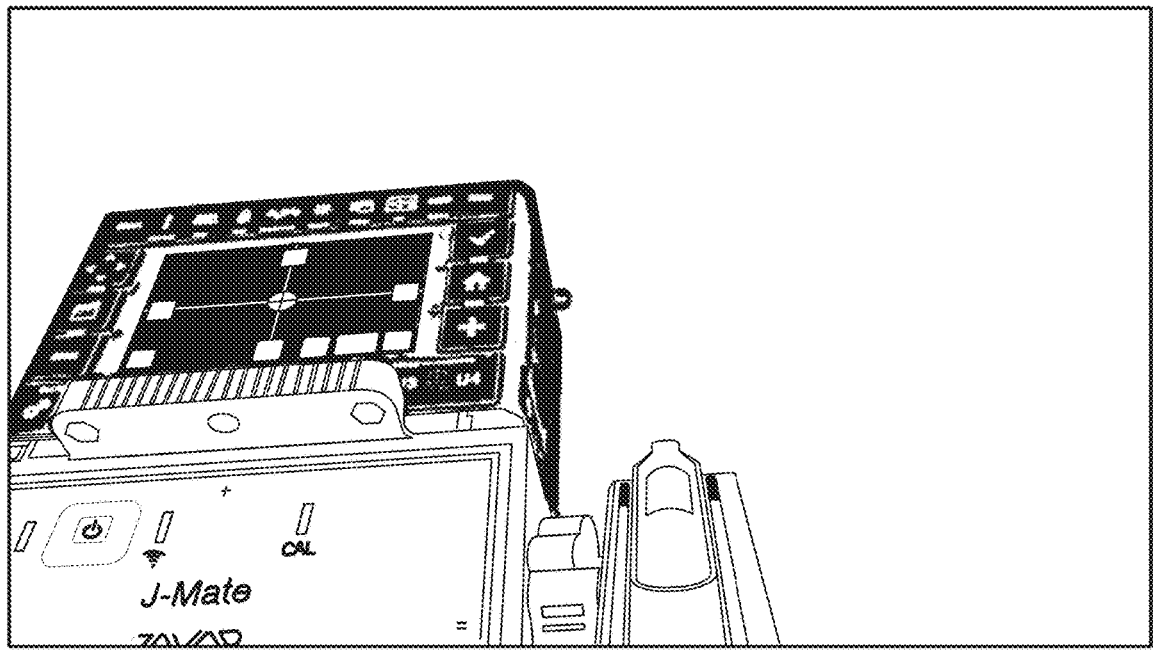
FIG. 16C depicts various stages of astro-seek calibration.
Figure 16D:
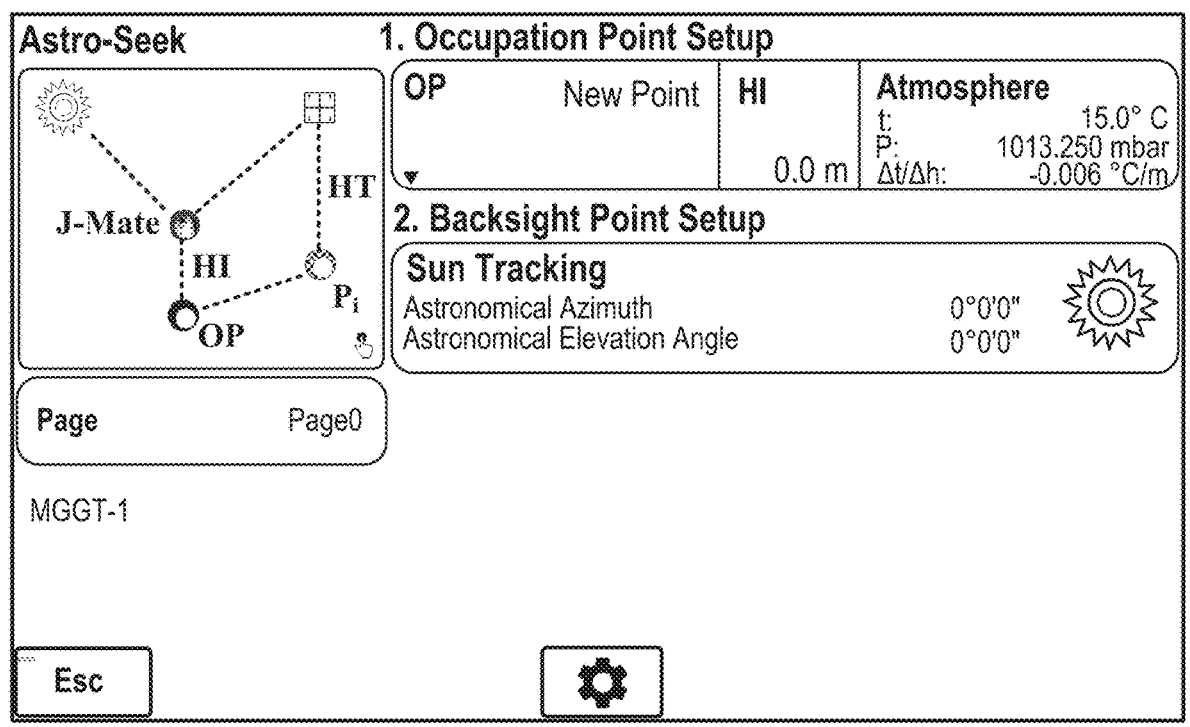
FIG. 16D depicts various stages of astro-seek calibration.

In some embodiments, the user may optionally use astro-seeking to calibrate the total station 1301. During astro-seeking calibration, orientation information from the occupation point 1411 to the sun 1611 or from other astronomical objects is used to establish accurate position information about the occupation point 1411 and to calibrate the encoders of the total station 1301. In some embodiments, the user first attaches a sun filter to the total station 1301. The sun filter protects the camera 1321 from strong light. In some embodiments, a sun filter is built into the camera lens, where the lens automatically adjusts its filter when strong light is detected. As shown in FIG. 16C, total station 1301 automatically finds the sun 1611, and then uses its orientation to automatically calibrate the encoders. In some embodiments, the total station 1301 automatically finds the sun by rotating the camera 1321, detecting the strength of light, and then continuing to rotate the camera 1321 in the direction of the strongest light until light strength is at a maximum. In some embodiments, the total station stores information about the sun's relative position in the sky based on date, time, and location on earth. As shown in FIG. 16C, various information about occupation point 1411 and the sun 1611 (e.g. "backsight point") is displayed.

Figure 17A:
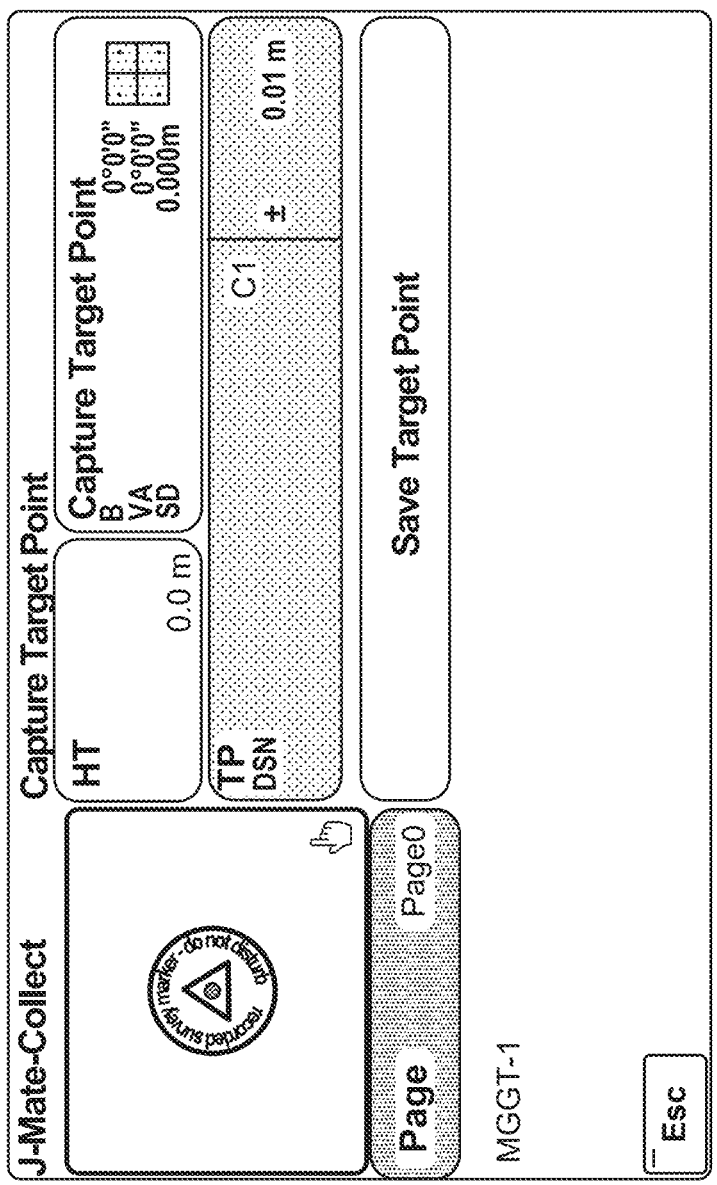
FIG. 17A illustrate various information being displayed during a collection phase using a GNSS device and total station.
Figure 17B:
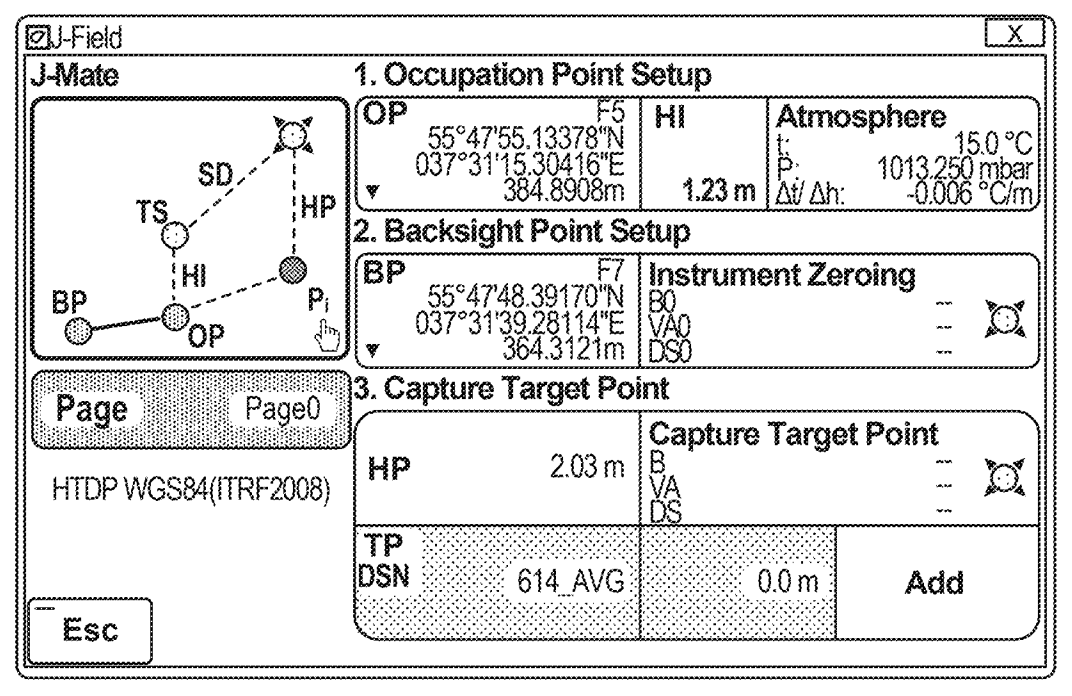
Figure 18A:
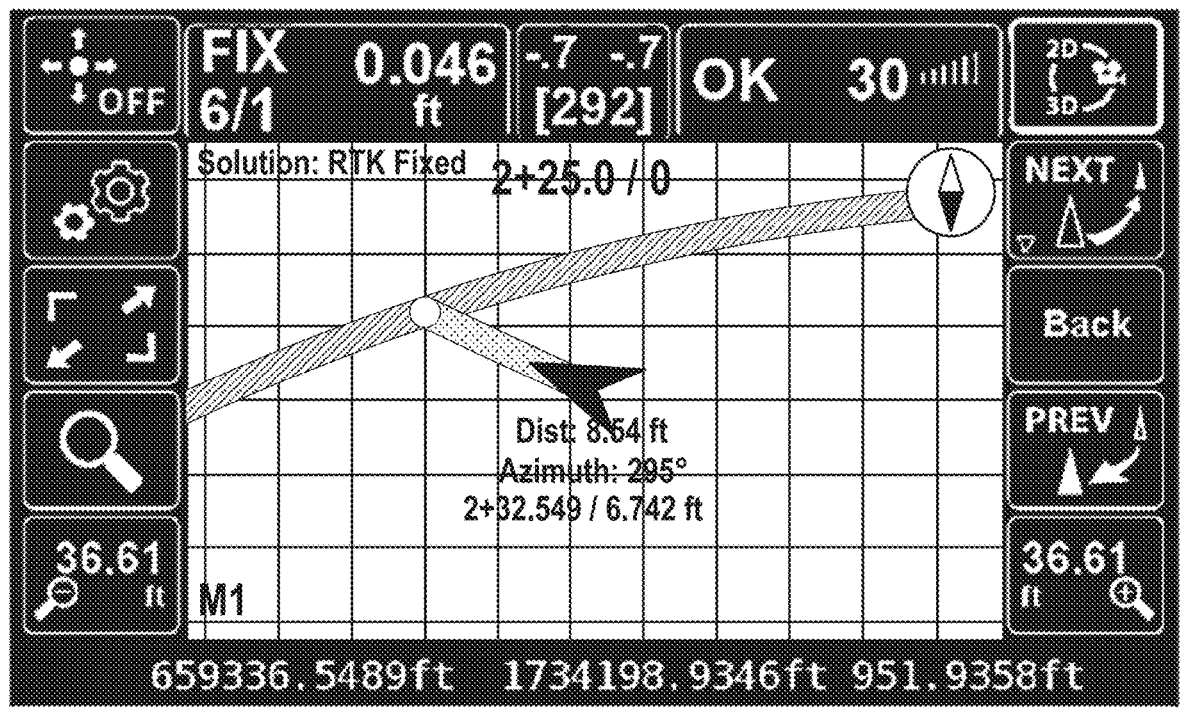
FIG. 18A depicts various stages of a stakeout of a region using a GNSS device and total station.
Figure 18B:
FIG. 18B depicts various stages of a stakeout of a region using a GNSS device and total station.
Figure 18C:
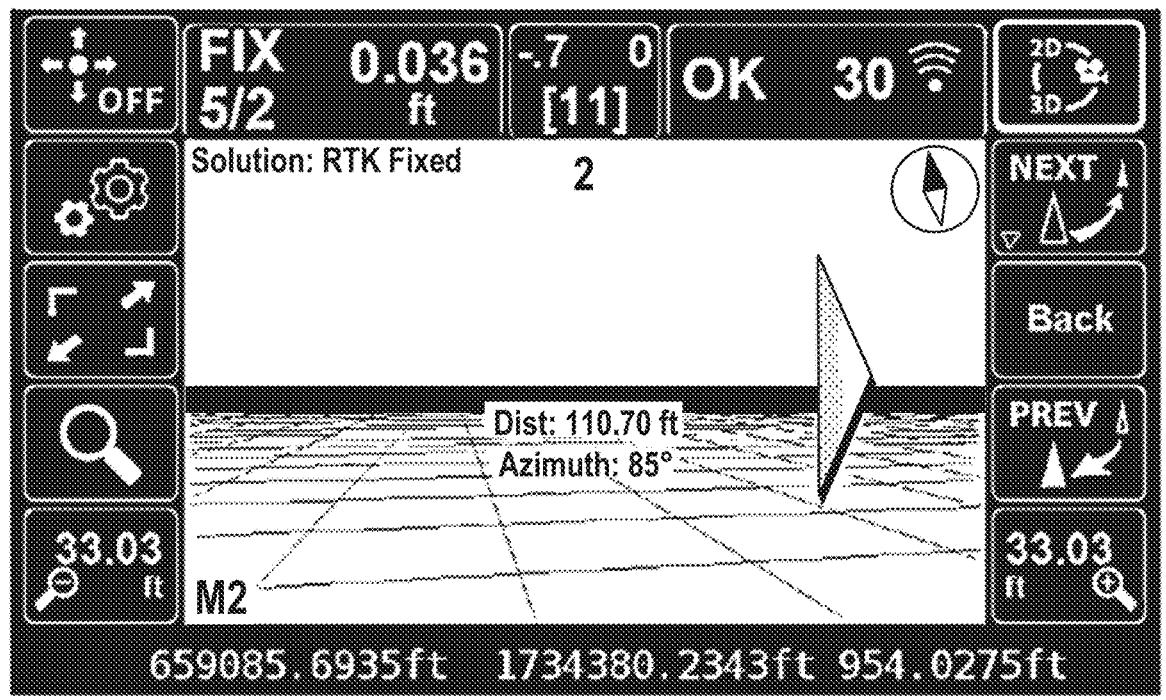
FIG. 18C depicts various stages of a stakeout of a region using a GNSS device and total station.
Figure 18D:
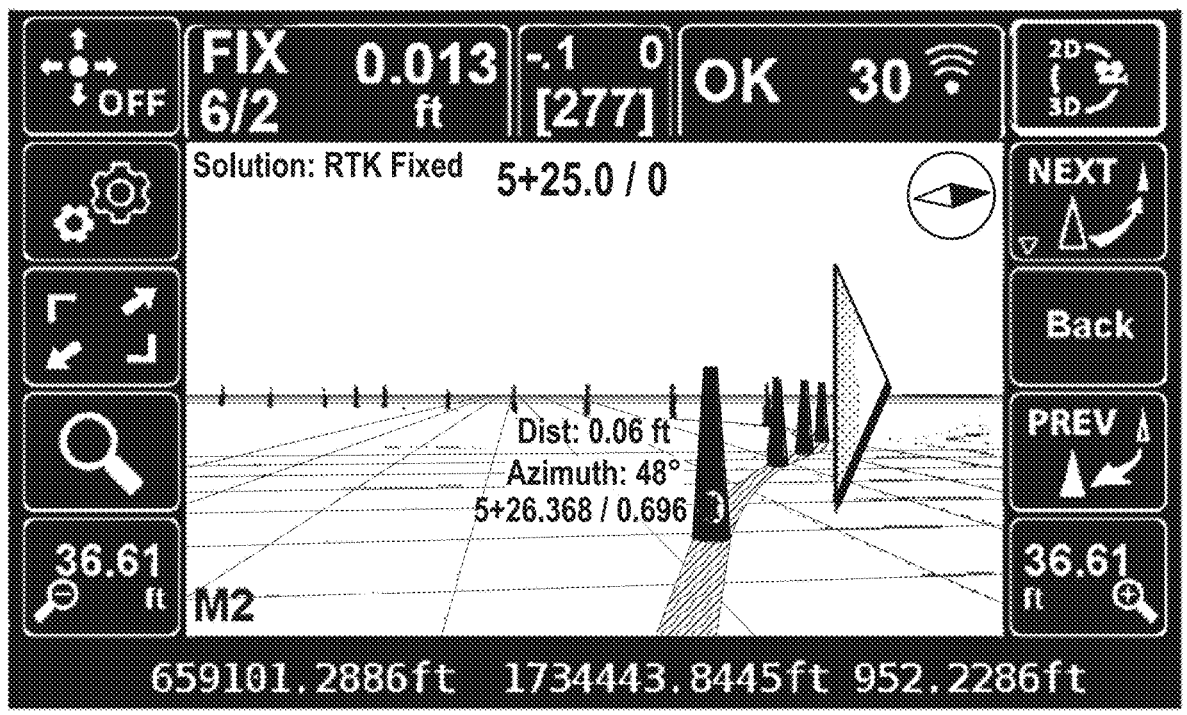
FIG. 18D depicts various stages of a stakeout of a region using a GNSS device and total station.

After calibration has been completed, for example by backsighting, resecting, astro-seeking, or other means, the total station 1301 is ready to measure ("collect") location information about unknown points. FIGS. 17A & 17B illustrate various information being displayed during a collection phase using a GNSS device and total station.

After calibration has been completed, for example by backsighting, resecting, astro-seeking, or other means, the total station 1301 is ready to stakeout a region in some embodiments. The functions and features of the total station 1301 stakeout are very similar to the conventional GNSS stakeout. In a conventional GNSS stakeout, RTK solutions guide the user to the stake points, but with the system disclosed herein, the camera 1321 follows the plus sign target 1333 and then the encoders and laser measurements provide guidance to the stakeout features like visual stakeout and other types of stakeout. FIGS. 18A-18D depicts various stages of a stakeout of a region using a GNSS device and total station.

In some embodiments, total station 1301 is also a camera-aided smart laser scanner. The camera 1321 identifies redundant points that do not need to be scanned but instead copies or interpolates from other readings without loss of information. For example, if the camera 1321 identifies a completely uniform area, it only scans the four corners of the area and interpolates in between. This feature can increase the effective speed of the scanner to be much higher than its native 10 points per second speed. This feature can also be used to find items such wires, poles, and "closest-in-view" items and measure them automatically.

In some embodiments, the total station 1301 scans around an intended target to measure the distance to the target and ensure that the target is found and measured reliable. The total station 1301 scans a circle around the target and shows the minimum and maximum distance from the total station 1301 to ensure that it is not measuring a wrong point, especially around the edge of a wall.

It will be appreciated that, for clarity purposes, the above description has described embodiments with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method of calibrating a total station using a GNSS device, said total station including a camera that is adjustable along horizontal and vertical axes with the angles being measured by encoders, wherein said GNSS device includes a communication antenna for receiving position data from a plurality of satellites, said method comprising:

determining a position of the total station at a first location based on position data received by the GNSS device that is physically coupled to the total station;

decoupling the total station from the GNSS device;

moving the GNSS device to a second location while leaving the total station at the first location;

determining the position of the GNSS device at the second location based on position data received by the GNSS device;

adjusting the position of the camera on the total station to image the GNSS device while at the second location;

determining the axes of the camera based on the orientation of the camera and the determined positions at the first and second locations; and calibrating the encoders of the total station based on the determined axes.

2. The method of claim 1, further comprising:

while moving the GNSS device to the second location, simultaneously tracking the GNSS device using the camera on the total station.

3. The method of claim 1, further comprising:

while moving the GNSS device to the second location, transmitting image data captured by the camera on the total station to the GNSS device; and displaying the image data on a display of the GNSS device.

4. The method of claim 2, wherein the simultaneously tracking the GNSS device using the camera on the total station comprises capturing image data of the GNSS device using the camera on the total station.

5. The method of claim 1, wherein the GNSS device includes a marker for recognition by image processing techniques on the total station.

6. The method of claim 1, wherein the GNSS device is configured to be mounted on top of the total station.

7. The method of claim 1, wherein the total station is configured to be mounted on top of a support structure.

8. The method of claim 1, wherein the adjusting the position of the camera comprises repositioning, using one or more motors of the total station, the camera on the total station such that a sign placed on the GNSS device is within a field of view of the camera on the total station; and determining an azimuth from the first location to the second location, wherein the calibrating the encoders of the total station is based on the determined azimuth.

9. The method of claim 8, wherein the sign placed on the GNSS device comprises a mark.

10. The method of claim 1, wherein the method further includes:

receiving an input indicative of a user selection of calibrating a laser module of the total station and the camera on the total station;

responsive to receiving the input, automatically locating a point of an object using the camera on the total station;

after locating the point using the camera, recording an orientation of the camera;

automatically locating the point of the object using the laser module of the total station;

after locating the point using the laser module, recording an orientation of the laser module; and calibrating an alignment between the camera and the laser module based on the recorded orientation of the camera and the recorded orientation of the laser module.

11. The method of claim 10, wherein the object comprises a QR image.

12. The method of claim 10, wherein automatically locating the point of the object using the camera of the total station comprises repositioning the camera such that the point of the object is at a center of a screen of the camera.

13. The method of claim 10, wherein automatically locating the point of the object using the laser module of the total station comprises repositioning the laser module such that the point of the object coincides with a beam of the laser module.

14. A method of calibrating a total station using a GNSS device, comprising:

- determining a position of a total station at a first location based on position data received by the GNSS device that is physically coupled to the total station;
- decoupling the total station from the GNSS device;
- moving the GNSS device to a second location while leaving the total station at the first location;
- determining the position of the GNSS device at the second location based on position data received by the GNSS device;
- adjusting the position of a camera on the total station to image the GNSS device while at the second location;
- determining horizontal and vertical axes of the camera based on the orientation of the camera and the determined positions at the first and second locations; and
- calibrating the total station based on the determined axes.

15. The method of claim 14, further comprising:
while moving the GNSS device to the second location, simultaneously tracking the GNSS device using the camera on the total station.

16. The method of claim 14, further comprising:
while moving the GNSS device to the second location, transmitting image data captured by the camera on the total station to the GNSS device; and
displaying the image data on a display of the GNSS device.

17. The method of claim 15, wherein the simultaneously tracking the GNSS device using the camera on the total station comprises capturing image data of the GNSS device using the camera on the total station.

18. The method of claim 14, wherein the GNSS device includes a marker for recognition by image processing techniques on the total station.

19. The method of claim 14, wherein the GNSS device is configured to be mounted on top of the total station.

20. The method of claim 14, wherein the total station is configured to be mounted on top of a support structure.

* * * * *